(12) United States Patent
Drury et al.

(10) Patent No.: US 11,803,826 B2
(45) Date of Patent: Oct. 31, 2023

(54) SYSTEMS AND METHODS OF DIRECT ACCOUNT TRANSFER

(71) Applicant: Xero Limited, Wellington (NZ)

(72) Inventors: Rodney Kenneth Drury, Havelock North (NZ); Matthew John Vickers, Wellington (NZ)

(73) Assignee: Xero Limited, Wellington (NZ)

( * ) Notice: Subject to any disclaimer, the term of this patent is extended or adjusted under 35 U.S.C. 154(b) by 0 days.

(21) Appl. No.: 17/664,761

(22) Filed: May 24, 2022

(65) Prior Publication Data
US 2022/0292466 A1 Sep. 15, 2022

Related U.S. Application Data

(63) Continuation of application No. 14/689,894, filed on Apr. 17, 2015, now abandoned, which is a (Continued)

(51) Int. Cl.
*G06Q 20/10* (2012.01)
*G06Q 20/38* (2012.01)
(Continued)

(52) U.S. Cl.
CPC ......... *G06Q 20/108* (2013.01); *G06Q 20/102* (2013.01); *G06Q 20/382* (2013.01);
(Continued)

(58) Field of Classification Search
CPC .. G06Q 20/023; G06Q 20/102; G06Q 20/108; G06Q 20/382; G06Q 20/3823; G06Q 20/3829; G06Q 20/42
See application file for complete search history.

(56) References Cited

U.S. PATENT DOCUMENTS

| | | |
|---|---|---|
| 5,963,925 A | 10/1999 | Kolling et al. |
| 6,044,362 A | 3/2000 | Neely |

(Continued)

FOREIGN PATENT DOCUMENTS

| | | |
|---|---|---|
| CN | 101354765 A | 1/2009 |
| CN | 103430199 A | 12/2013 |

(Continued)

OTHER PUBLICATIONS

"U.S. Appl. No. 14/446,782, Examiner Interview Summary dated May 9, 2017", 2 pgs.

(Continued)

*Primary Examiner* — John W Hayes
*Assistant Examiner* — Wodajo Getachew
(74) *Attorney, Agent, or Firm* — Schwegman Lundberg & Woessner, P.A.

(57) ABSTRACT

A financial institution and a payment initiator may exchange public keys to enable the secure exchange of data. A business wishing to collect payment can provide its account information to the payment initiator. A customer wishing to pay can instruct the payment initiator to encrypt the business's account information along with details for a particular invoice and transmit the information to the financial institution. The financial institution can decrypt the information and initiate a transfer of money from the customer to the business. The financial institution may present the information about the transaction to the customer for modification or confirmation before initiating the transfer. The information may be sent from the payment initiator to the financial institution via the customer. After the payment has been initiated by the financial institution, a confirmation may be sent to the customer, the payment initiator, the business, or any suitable combination thereof.

20 Claims, 14 Drawing Sheets

Related U.S. Application Data continuation of application No. 14/446,782, filed on Jul. 30, 2014, now Pat. No. 9,741,024.

(60) Provisional application No. 61/860,771, filed on Jul. 31, 2013.

(51) Int. Cl.
*G06Q 20/02* (2012.01)
*G06Q 20/42* (2012.01)

(52) U.S. Cl.
CPC ..... *G06Q 20/3823* (2013.01); *G06Q 20/3829* (2013.01); *G06Q 20/023* (2013.01); *G06Q 20/42* (2013.01)

(56) References Cited

U.S. PATENT DOCUMENTS

| | | | |
|---|---|---|---|
| 6,314,517 B1 | 11/2001 | Moses et al. | |
| 6,324,525 B1 | 11/2001 | Kramer et al. | |
| 7,110,986 B1 | 9/2006 | Zajkowski et al. | |
| 7,404,204 B2* | 7/2008 | Davenport | G06F 21/41 726/8 |
| 8,145,189 B2 | 3/2012 | Power et al. | |
| 8,165,958 B1* | 4/2012 | McLaughlin | G06Q 20/10 705/40 |
| 8,417,628 B2 | 4/2013 | Poplawski et al. | |
| 8,850,567 B1 | 9/2014 | Hsieh | |
| 9,197,696 B1 | 11/2015 | Jakatdar et al. | |
| 9,741,024 B2 | 8/2017 | Drury et al. | |
| 9,928,490 B1* | 3/2018 | Vancini | G06Q 40/02 |
| 2001/0047332 A1 | 11/2001 | Gonen-Friedman et al. | |
| 2002/0082987 A1 | 6/2002 | Wilson | |
| 2002/0082990 A1 | 6/2002 | Curcuri | |
| 2002/0120566 A1 | 8/2002 | Tim | |
| 2002/0194123 A1 | 12/2002 | Agee et al. | |
| 2003/0009427 A1 | 1/2003 | Pan | |
| 2003/0208441 A1 | 11/2003 | Poplawski et al. | |
| 2004/0030645 A1 | 2/2004 | Monaghan | |
| 2004/0049439 A1 | 3/2004 | Johnston et al. | |
| 2004/0059924 A1 | 3/2004 | Soto et al. | |
| 2004/0044603 A1 | 4/2004 | Gordon-Ervin et al. | |
| 2005/0154664 A1 | 7/2005 | Guy et al. | |
| 2005/0177518 A1 | 8/2005 | Brown | |
| 2005/0262026 A1 | 11/2005 | Watkins et al. | |
| 2005/0283259 A1 | 12/2005 | Wolpow | |
| 2006/0282680 A1 | 12/2006 | Kuhlman et al. | |
| 2007/0233573 A1 | 10/2007 | Wang et al. | |
| 2008/0172598 A1 | 7/2008 | Jacobsen et al. | |
| 2008/0320576 A1 | 12/2008 | Curling | |
| 2009/0043687 A1 | 2/2009 | van Soestbergen et al. | |
| 2009/0068982 A1 | 3/2009 | Chen et al. | |
| 2009/0265775 A1 | 10/2009 | Wisely et al. | |
| 2010/0082481 A1 | 4/2010 | Lin et al. | |
| 2011/0270749 A1 | 11/2011 | Bennett et al. | |
| 2011/0288881 A1 | 11/2011 | Machani | |
| 2012/0072296 A1 | 3/2012 | Sinton | |
| 2012/0089521 A1 | 4/2012 | Abrevaya et al. | |
| 2012/0089943 A1 | 4/2012 | Jain et al. | |
| 2012/0116963 A1 | 5/2012 | Klein et al. | |
| 2012/0116967 A1 | 5/2012 | Klein et al. | |
| 2012/0221466 A1 | 8/2012 | Look | |
| 2012/0259717 A1 | 10/2012 | Griffin et al. | |
| 2012/0290421 A1 | 11/2012 | Qawami et al. | |
| 2012/0290472 A1* | 11/2012 | Mullen | G06Q 20/385 705/39 |
| 2013/0080298 A1 | 3/2013 | Latulipe et al. | |
| 2013/0137405 A1 | 5/2013 | Kirik et al. | |
| 2013/0273882 A1 | 10/2013 | Walsh et al. | |
| 2015/0003951 A1 | 2/2015 | Drury et al. | |
| 2015/0220889 A1 | 8/2015 | Drury et al. | |
| 2015/0254672 A1 | 9/2015 | Huesch et al. | |

FOREIGN PATENT DOCUMENTS

| | | |
|---|---|---|
| CN | 105593882 A | 5/2016 |
| EP | 2680206 A2 | 1/2014 |
| IN | 201617005091 A | 8/2016 |
| WO | WO-2001080100 A1 | 10/2001 |
| WO | WO-2004025392 A2 | 3/2004 |
| WO | WO-2013059815 A1 | 4/2013 |
| WO | WO-2015017707 A2 | 2/2015 |
| WO | WO-2015017707 A3 | 2/2015 |

OTHER PUBLICATIONS

"U.S. Appl. No. 14/446,782, Notice of Allowance dated Mar. 15, 2017", 16 pgs.

"U.S. Appl. No. 14/446,782, Notice of Allowance dated Jul. 3, 2017", 9 pgs.

"U.S. Appl. No. 14/689,894, Advisory Action dated Sep. 26, 2018", 3 pgs.

"U.S. Appl. No. 14/689,894, Appeal Brief filed Dec. 3, 2018", 19 pgs.

"U.S. Appl. No. 14/689,894, Appeal Decision dated May 13, 2020", 13 pgs.

"U.S. Appl. No. 14/689,894, Examiner Interview Summary dated Jan. 26, 2016", 3 pgs.

"U.S. Appl. No. 14/689,894, Examiner Interview Summary dated Jul. 23, 2015", 3 pgs.

"U.S. Appl. No. 14/689,894, Examiner Interview Summary dated Oct. 18, 2016", 3 pgs.

"U.S. Appl. No. 14/689,894, Examiner's Answer dated Mar. 22, 2019", 6 pgs.

"U.S. Appl. No. 14/689,894, Final Office Action dated Feb. 19, 2021", 14 pgs.

"U.S. Appl. No. 14/689,894, Final Office Action dated Feb. 24, 2022", 14 pgs.

"U.S. Appl. No. 14/689,894, Final Office Action dated Feb. 28, 2017", 21 pgs.

"U.S. Appl. No. 14/689,894, Final Office Action dated Jun. 20, 2018", 14 pgs.

"U.S. Appl. No. 14/689,894, Final Office Action dated Sep. 17, 2020", 14 pgs.

"U.S. Appl. No. 14/689,894, Final Office Action dated Nov. 6, 2015", 24 pgs.

"U.S. Appl. No. 14/689,894, Non Final Office Action dated Aug. 17, 2016", 25 pgs.

"U.S. Appl. No. 14/689,894, Non Final Office Action dated Sep. 16, 2021", 17 pgs.

"U.S. Appl. No. 14/689,894, Non Final Office Action dated Sep. 18, 2017", 17 pgs.

"U.S. Appl. No. 14/689,894, Reply Brief filed May 22, 2019", 7 pgs.

"U.S. Appl. No. 14/689,894, Response filed Feb. 8, 2016 to Final Office Action dated Nov. 6, 2015", 15 pgs.

"U.S. Appl. No. 14/689,894, Response filed Feb. 20, 2018 to Non Final Office Action dated Sep. 18, 2017", 17 pgs.

"U.S. Appl. No. 14/689,894, Response filed May 13, 2021 to Final Office Action dated Feb. 19, 2021", 15 pgs.

"U.S. Appl. No. 14/689,894, Response filed Jul. 27, 2015 to Non Final Office Action dated Jun. 4, 2015", 14 pgs.

"U.S. Appl. No. 14/689,894, Response filed Aug. 20, 2018 to Final Office Action dated Jun. 20, 2018", 14 pgs.

"U.S. Appl. No. 14/689,894, Response filed Aug. 24, 2017 to Final Office Action dated Feb. 18, 2017", 20 pgs.

"U.S. Appl. No. 14/689,894, Response filed Nov. 17, 2016 to Non Final Office Action dated Aug. 17, 2016", 14 pgs.

"U.S. Appl. No. 14/689,894, Response filed Dec. 16, 2021 to Non Final Office Action dated Sep. 16, 2021", 15 pgs.

"U.S. Appl. No. 14/689,894, Response filed Dec. 17, 2020 to Final Office Action dated Sep. 17, 2020", 13 pgs.

"U.S. Appl. No. 14/689,894, Response to Advisory Action dated Sep. 26, 2018 filed Jul. 13, 2020", 13 pgs.

"U.S. Appl. No. 14/689,894. Response filed Jun. 4, 2015 to Non-Final Office Action dated Apr. 17, 2015", 28 pgs.

(56) References Cited

OTHER PUBLICATIONS

"Australia Application Serial No. 2015100161, Subsequent Examiners Report dated Aug. 7, 2015", 3 pgs.
"Australia Application Serial No. 2015100163, Subsequent Examiners Report dated Aug. 7, 2015", 3 pgs.
"Australian Application Serial No. 2015100161, Formalities Report dated Feb. 17, 2015", 2 pgs.
"Australian Application Serial No. 2015100161, Office Action dated May 13, 2015", 4 pgs.
"Australian Application Serial No. 2015100161, Response filed Oct. 21, 2015 Office Action dated Aug. 7, 2015", 11 pgs.
"Australian Application Serial No. 2015100163, Formalities Report dated Feb. 17, 2015", 2 pgs.
"Australian Application Serial No. 2015100163, Office Action dated May 13, 2015", 4 pgs.
"Australian Application Serial No. 2015100163, Response filed Oct. 21, 2015 to Office Action dated Aug. 7, 2015", 13 pgs.
"Australian Application Serial No. 2015100164, Formalities Report dated Feb. 17, 2015", 2 pgs.
"Australian Application Serial No. 2015100164, Office Action dated May 13, 2015", 4 pgs.
"Australian Application Serial No. 2015100164, Office Action dated Aug. 18, 2015", 5 pgs.
"Australian Application Serial No. 2015100164, Response filed Mar. 8, 2016 to Substantive Examination Report dated Nov. 13, 2015", 31 pgs.
"Australian Application Serial No. 2015100164, Response filed Aug. 31, 2016 to Subsequent Examination Report dated Aug. 24, 2016", 6 pgs.
"Australian Application Serial No. 2015100164, Response filed Aug. 1, 2016 to Subsequent Examiners Report dated Jun. 24, 2016", 11 pgs.
"Australian Application Serial No. 2015100164, Subsequent Examination Report dated Aug. 24, 2016", 4 pgs.
"Australian Application Serial No. 2015100164, Subsequent Examiners Report dated Jun. 24, 2016".
"Australian Application Serial No. 2015100164, Substantive Examination Report dated Nov. 13, 2015", 4 pgs.
"Australian Application Serial No. 2015100166, Formalities Report dated Feb. 17, 2015", 2 pgs.
"Australian Application Serial No. 2015100166, Office Action dated Feb. 12, 2016".
"Australian Application Serial No. 2015100166, Office Action dated May 13, 2015", 3 pgs.
"Australian Application Serial No. 2015100166, Office Action dated Aug. 18, 2015", 5 pgs.
"Australian Application Serial No. 2015100166, Response filed Mar. 8, 2016 to Subsequent Examiners Reports dated Nov. 13, 2015 and Feb. 12, 2016", 31 pgs.
"Australian Application Serial No. 2015100166, Response filed Jul. 10, 2015 to Office Action dated May 13, 2015".
"Australian Application Serial No. 2015100166, Response filed Aug. 31, 2016 to Subsequent Examiners Report dated Aug. 24, 2016", 6 pgs.
"Australian Application Serial No. 2015100166, Response filed Sep. 14, 2015", 8 pgs.
"Australian Application Serial No. 2015100166, Response filed Oct. 21, 2015 to Office Action dated Aug. 18, 2015", 12 pgs.
"Australian Application Serial No. 2015100166, Response filed Aug. 1, 2016 to Subsequent Examiners Report dated Jun. 24, 2016", 11 pgs.
"Australian Application Serial No. 2015100166, Subsequent Examiners Report dated Nov. 13, 2015", 4 pgs.
"Australian Application Serial No. 2015100166, Subsequent Examiners Report dated Jun. 24, 2016", 4 pgs.
"Australian Application Serial No. 2015100166, Subsequent Examiners Report dated Aug. 24, 2016", 4 pgs.
"Australian Application Serial No. 2015101667, Voluntary Amendment filed Feb. 3, 2016", 9 pgs.
"Chinese Application Serial No. 201480048034.6, Office Action dated Oct. 8, 2018", W/English translation, 20 pgs.
"Chinese Application Serial No. 201480048034.6, Response Filed Dec. 21, 2018 to Office Action dated Oct. 8, 2018", w/English Claims, 10 pgs.
"Chinese Application Serial No. 201480048034.6, Voluntary Amendment dated Aug. 23, 2016", w/ English Claims, 13 pgs.
"European Application Serial No. 14832987.3, Communication Pursuant to Article 94(3) EPC dated Mar. 29, 2018", 10 pgs.
"European Application Serial No. 14832987.3, Extended European Search Report dated Feb. 6, 2017", 9 pgs.
"European Application Serial No. 14832987.3, Response filed Sep. 4, 2017 to Extended European Search Report dated Feb. 6, 2017", 26 pgs.
"European Application Serial No. 14832987.3, Response filed Sep. 19, 2016 to Communication pursuant to Rules 161(1) and 162 EPC dated Mar. 15, 2016", 21 pgs.
"Indian Application Serial No. 201617005091, Examination Report dated Jun. 4, 2020", 7 pgs.
"Indian Application Serial No. 201617005091, Voluntary Amendment filed on Aug. 23, 2017", (W/ English Claims), 13 pgs.
"Information Security and Cryptology—ISIC'99", Lecture Notes in Computer Science 1797, [Online], Retrieved from the Internet: <URL: http://download.springer.com/static/pdf/590/bfm%253A978-3-540-45568-4%252F1.pdf?auth66=1414691530_aa274d1b154d3d2d7895ab1536afbe8c&ext=.pdf>, (2000), 288 pgs.
"International Application Serial No. PCT/US2014/049247, Response filed Jul. 2, 2015 to Written Opinion dated Apr. 2, 2015".
"International Application Serial No. PCT/US2014/049247, International Preliminary Report on Patentability dated Sep. 14, 2015", 5 pgs.
"International Application Serial No. PCT/US2014/049247, International Preliminary Report on Patentability dated Nov. 9, 2015", 23 pgs.
"International Application Serial No. PCT/US2014/049247, International Search Report dated Apr. 2, 2015", 2 pgs.
"International Application Serial No. PCT/US2014/049247, Written Opinion dated Apr. 2, 2015", 5 pgs.
"Sales Invoices on Vimeo", Retrieved from the Internet: <https://vimeo.com/50275970- 1 Minute 48 Seconds, (Sep. 27, 2012), 4 pgs.
"South Africa Application Serial No. 2016/00817, Amendment filed Sep. 2, 2016", in English, 12 pgs.
Trevathan, Jarrod, et al., "Privacy and Anonymity in Untrusted Data Stores", Conference—The 22nd Australasian Database Conference, (Jan. 2011), 10 pgs.
U.S. Appl. No. 61/860,771, filed Jul. 31, 2013, Systems and Methods of Direct Bank Transfer.

\* cited by examiner

700

710 — CREATE INVOICE    720 — 234.00 NZD

730 — BAYSIDE CLUB ▼

740 — TAX INVOICE ▼                                              750 — *DEMO CO.*

760 —
TO    BAYSIDE CLUB
      ATTN: CLUB SECRETARY
      P O BOX 3354
      S. MAILING CENTER
      MADEUPVILLE
      NEW ZEALAND

770 —
| INVOICE NUMBER | INV-0038 |
| REFERENCE | GB1-WHITE |
| GST NUMBER | 101-2-303 |
| ISSUED | 9 JUNE 2013 |
| DUE | 19 JULY 2013 (11 DAYS REMAINING) |

780 —
| DESCRIPTION | QUANTITY | UNIT PRICE | AMOUNT |
|---|---|---|---|
| GOLF BALLS – WHITE SINGLE | 40.00 | 4.87 | 194.78 |
| COURIER CHARGE | 1.00 | 8.70 | 8.70 ▼ |

790 —
| SUBTOTAL | 203.48 |
| TOTAL GST 15% | 30.52 |
| AMOUNT DUE NZD | 234.00 |

*FIG. 7*

┌─ 800
                                                815   820
   805    810                                    │    │
    │      │                                   ┌─┴──┐┌┴───┐ _ ☐ X
   ┌─┴───┐┌┴──────────┐                        │PDF │ CSV││SAVE│
   │PAY NOW││234.00 NZD│                       └────┘ └───┘└────┘

830 ─┌─────────────────────────────────────┐       835
        │ QUESTIONS OR COMMENTS ABOUT THIS BILL?│       │
        └─────────────────────────────────────┘        │
   840 ─┌──────────┐                          ┌────────┴──────┐
        │TAX INVOICE│                         │   DEMO CO.    │
        └──────────┘                          └───────────────┘

┌─────────────────────────┐        850
        │TO      BAYSIDE CLUB     │          ╲
        │        ATTN: CLUB       │   ┌───────────────────────┐
        │SECRETARY                │   │FROM  ORANGE DEMO CO.  │
        │        P O BOX 3354     │   │      23 MAIN ST.      │
   845 ─│        S. MAILING CENTER│   │      CENTRAL CITY     │
        │        MADEUPVILLE      │   │      MARINEVILLE      │
        │        NEW ZEALAND      │   │      1234             │
        └─────────────────────────┘   └───────────────────────┘

┌──────────────────────────────────────────────────────┐
        │INVOICE NUMBER           INV-0038                     │
   855 ─│REFERENCE                GB1-WHITE                    │
        │GST NUMBER               101-2-303                    │
        │ISSUED                   9 JUNE 2013                  │
        │DUE                      19 JULY 2013 (11 DAYS REMAINING)│
        └──────────────────────────────────────────────────────┘

┌──────────────────────────────────────────────────────┐
        │DESCRIPTION          QUANTITY   UNIT PRICE     AMOUNT │
        │GOLF BALLS – WHITE SINGLE  40.00    4.87       194.78 │
   860 ─│COURIER CHARGE           1.00       8.70         8.70 │
        │                              ┌───────────────────────┤
        │                          870─│SUBTOTAL         203.48│
        │                              │TOTAL GST 15%          │
        │                              │30.52                  │
        │                              │AMOUNT DUE NZD   234.00│
        └──────────────────────────────┴───────────────────────┘

*FIG. 8*

SYSTEMS AND METHODS OF DIRECT ACCOUNT TRANSFER

CLAIM OF PRIORITY UNDER 35 U.S.C. § 120

The application is a continuation application under 35 USC § 120 of U.S. patent application Ser. No. 14/689,894, filed Apr. 17, 2015, entitled "Systems and Methods of Direct Account Transfer," which is a continuation application under 35 USC § 120 of U.S. patent application Ser. No. 14/446,782, filed Jul. 30, 2014, entitled "Systems and Methods of Direct Bank Transfer," which claimed priority from U.S. Provisional Application No. 61/860,771, filed Jul. 31, 2013, entitled "Systems and Methods of Direct Bank Transfer," which applications are incorporated by reference as if reproduced herein and made a part hereof in their entirety, and the benefit of priority of each of which is claimed herein.

TECHNICAL FIELD

The present disclosure generally relates to monetary transfers and, more specifically, to systems and methods for facilitating direct account transfers.

BACKGROUND

Merchants send invoices to customers with information regarding money owed by a customer to a merchant. A customer pays an invoice by writing a check, using a credit card, transferring money via a third party, or transferring money from a customer bank account to a merchant bank account. Money transfers between banks may be performed using the Automated Clearing House (ACH).

To make an ACH transfer, a customer connects to a server associated with his or her bank, enters the transaction details, and submits the transfer request. The money is transferred directly to the merchant account from the customer account via ACH.

To transfer money via a third party, the customer connects to a server associated with the third party, enters the transaction details, and submits the transfer request. The money is transferred from the customer account to an account of the third party and then from the third-party account to the merchant account.

BRIEF DESCRIPTION OF THE DRAWINGS

Some embodiments are illustrated by way of example and not of limitation in the figures of the accompanying drawings.

FIG. 7 is an interface diagram depicting an example user interface for creating an invoice from a business, according to some embodiments.

FIG. 8 is an interface diagram depicting an example user interface displaying an invoice from a business, according to some embodiments.

DETAILED DESCRIPTION

Example systems and methods to facilitate direct bank transfers are described. In the following description, for purposes of explanation, numerous specific details are set forth in order to provide a thorough understanding of example embodiments. It will be evident, however, to one skilled in the art that the present technology may be practiced without these specific details.

The technology described herein provides online accounting software to businesses with features such as a payment mechanism available to a business's customers, where the payment mechanism may drive payments through a bank rather than third-party payment services (e.g., credit card transaction processors, PayPal, and so on). In some embodiments, financial institutions may also use such payment features to let trusted partners submit payments to them for confirmation and processing.

The financial institution and the payment initiator may exchange public keys, to enable the secure exchange of data. The business provides its account information to the payment initiator. The payment initiator can encrypt the account information along with details for a particular invoice (such as payment amount and payment date) and transmit the information to the financial institution. The financial institution can decrypt the information and initiate a transfer of money from one of the customer's bank accounts to the business on the payment date. In some example embodiments, the financial institution presents the information about the transaction to the customer for modification or confirmation before initiating the transfer. In some example embodiments, the financial institution allows the customer to confirm or cancel the transaction, but not to modify it. For example, the payment initiator may include one or more flags in the data to indicate whether the various prepopulated fields for the transaction (e.g., payment amount, payment date, and so on) can be modified by the customer. Based on the flags, the financial institution can modify the options presented to the customer.

The information may be sent from the payment initiator to the financial institution via the customer. For example, the encrypted data may be sent from a web site of the payment initiator to a web browser of the customer running on a customer device. After the payment has been initiated by the financial institution, a confirmation may be sent to the customer, the payment initiator, the business, or any suitable combination thereof.

Figure 1:
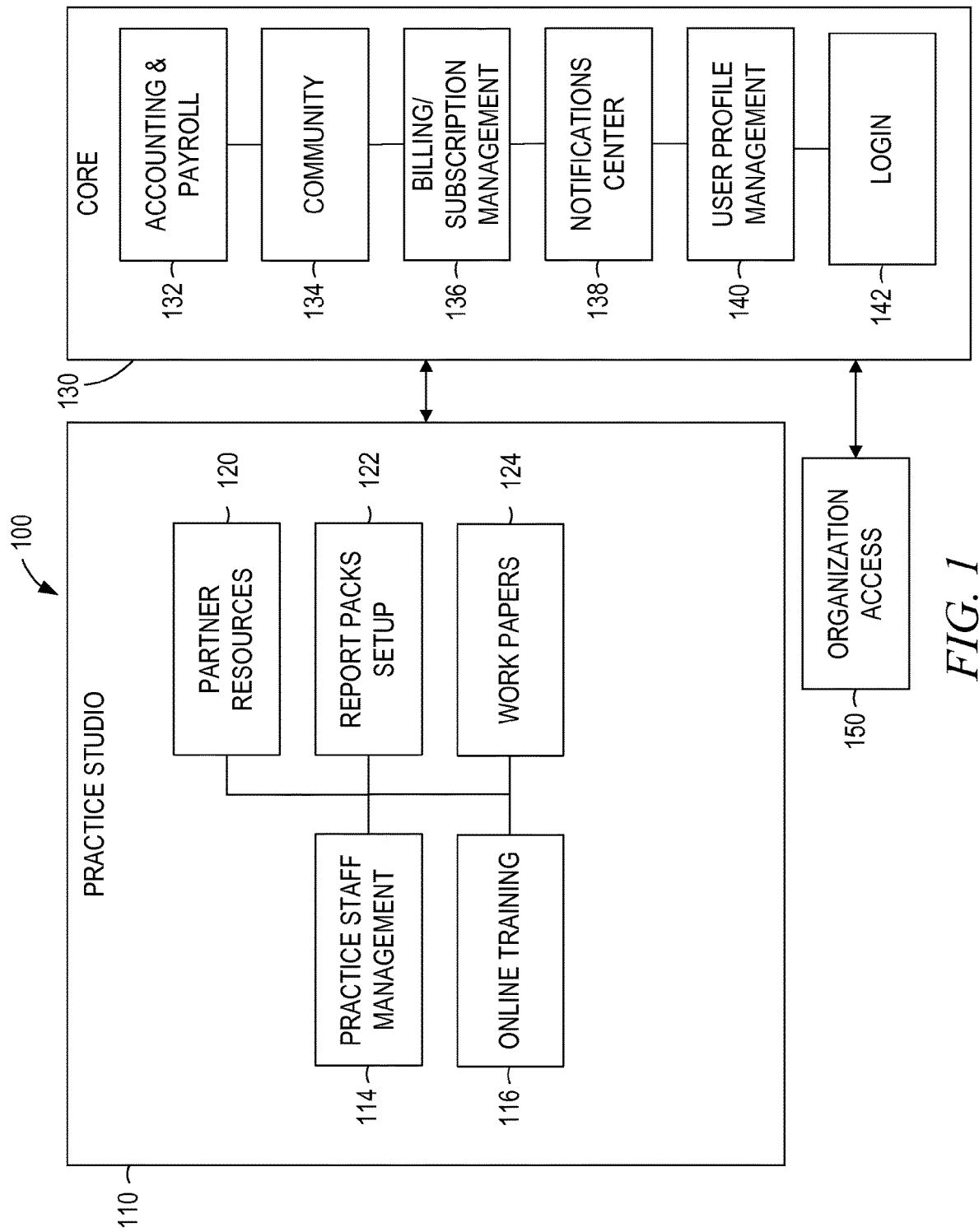
FIG. 1 is a block diagram depicting an example single ledger accounting platform, according to some embodiments.

FIG. 1 is a block diagram depicting an example single ledger accounting system 100. A single ledger accounting system 100 may provide accounting tools to a particular entity managing accounting for one or more businesses. The example single ledger accounting system 100 may include a practice studio 110 that allows an entity to manage one or more businesses and an organization access module 150 that provides a business with tools for managing accounting data for that particular business. The practice studio 110 may include a practice staff management module 114, an online training module 116, a partner resources module 120, a report packs setup module 122, and a work papers module 124. The practice studio 110 may be in communication with core features 130. The core features 130 may include an accounting and payroll module 132, a community module 134, a billing/subscription management module 136, a notifications center module 138, a user profile management module 140, and a login module 142. The organization access module 150 may be in communication with the core features 130. The practice studio 110 and core features may be accessed by an entity using a login module 142.

As shown in FIG. 1, features of the system 100 are divided into three areas based on the target user. The features of the practice studio 110 provide a suite of tools for accountants to interact with their clients and manage their practices. The core features 130 provide the core functionality and user tools common to both accountants and businesses. The organization access 150 provides a user interface for individual businesses to access their data.

Practice studio 110 is the central login for accountants. For example, an accountant with multiple clients, each of which is a small business, can login using practice studio 110 and gain access to the accounting data for the clients, messages from the clients, and so on.

The practice staff management module 114 provides the ability for the manager of an accounting practice to control settings for the staff of the practice. For example, some staff members may have read-only access to data for certain clients, some staff members may have read-write access for certain clients, some staff members may be able to modify the access permissions for other staff members, and so on.

The online training module 116 provides training for accountants and their staff. In some cases, the provided training includes one or more video presentations and one or more online tests. Notification of passing a test at completion of a training may be provided. For example, a staff member may take a training course and, upon successful completion, the accountant supervising the staff member may receive a notification of the successful completion.

The partner resources module 120 provides information regarding third-party partners. For example, a third party may provide tools that interact with the system to provide useful functionality beyond that of the system alone. The user can access the partner resources module 120 to learn about available third-party tools. For example, links to third-party websites, documentation, videos, and search tools may all be provided.

The report packs setup module 122 provides tools to allow accountants to create and generate standardized sets of reports. For example, a profit and loss statement and quarterly report could both be added to a pack. The accountant would then be able to easily generate both reports for any selected client, or generate the reports for every client.

The work papers module 124 provides tools for accountants to interactively create financial reports. For example, an accountant can enter known data for a client into the work paper, and then send the work paper to the client with an indication of data needed from the client. After the client enters the missing data into the work paper, the accountant can complete the report.

The core features 130 includes modules that are used both by accountants and organizations. The accounting and payroll module 132 provides the general ledger for organizations. The general ledger may be integrated with the organization's payroll, bypassing the separate step of entering payroll data into the general ledger each pay period. The accounting and payroll module 132 accesses banking data for each client business. The banking data may be imported into either through a bank feed or a user- or accountant-created document. The accounting and payroll module 132 may also communicate with third-party tools via an application protocol interface (API).

The community module 134 provides a forum through which users can communicate. For example, a user with a question may post a topic in the forum and later receive a helpful response from another user. Information taken from the user profile (e.g., the user profile managed via the user profile management module 140) may appear along with forum posts by the user. For example, a user name, an image of the user, and the user's status as an accountant or member of an organization may each be shown.

The billing/subscription management module 136 allows a user to configure one or more billing accounts for each organization using the system. The system may periodically charge a subscription fee for access (e.g., a monthly or annual subscription fee). The subscription fee may be automatically deducted from the one or more billing accounts.

The notifications center module 138 provides notifications to users. For example, users may send messages to each other, which appear as notifications. Notifications may also be created by the system (e.g., by accounting and payroll module 132) based on events. For example, a minimum account balance for a particular bank account may be set by a user via the accounting & payroll module 132. When the balance for that bank account drops below the minimum account balance, a notification can be generated by the system informing the user.

The user profile management module 140 allows a user to manage the profile of the user's organization and the profiles of others based on permission settings. For example, an accountant may have permission to manage the profiles of the accountant's clients. The profile may include public-facing information such as a business name and address.

The login module 142 verifies the identify of a user logging into the system (e.g., via user name and password). Based on the user's identity, a user interface is presented that includes a list of organizations that a user has access to. For most small business clients, the list will consist of a single organization.

The organization access module 150 accesses the core features 130 for a single organization. The organization access module 150 presents, after user verification by the login module 142, a user interface with options for a single organization without the additional features used only by the practice studio 110.

Figure 2:
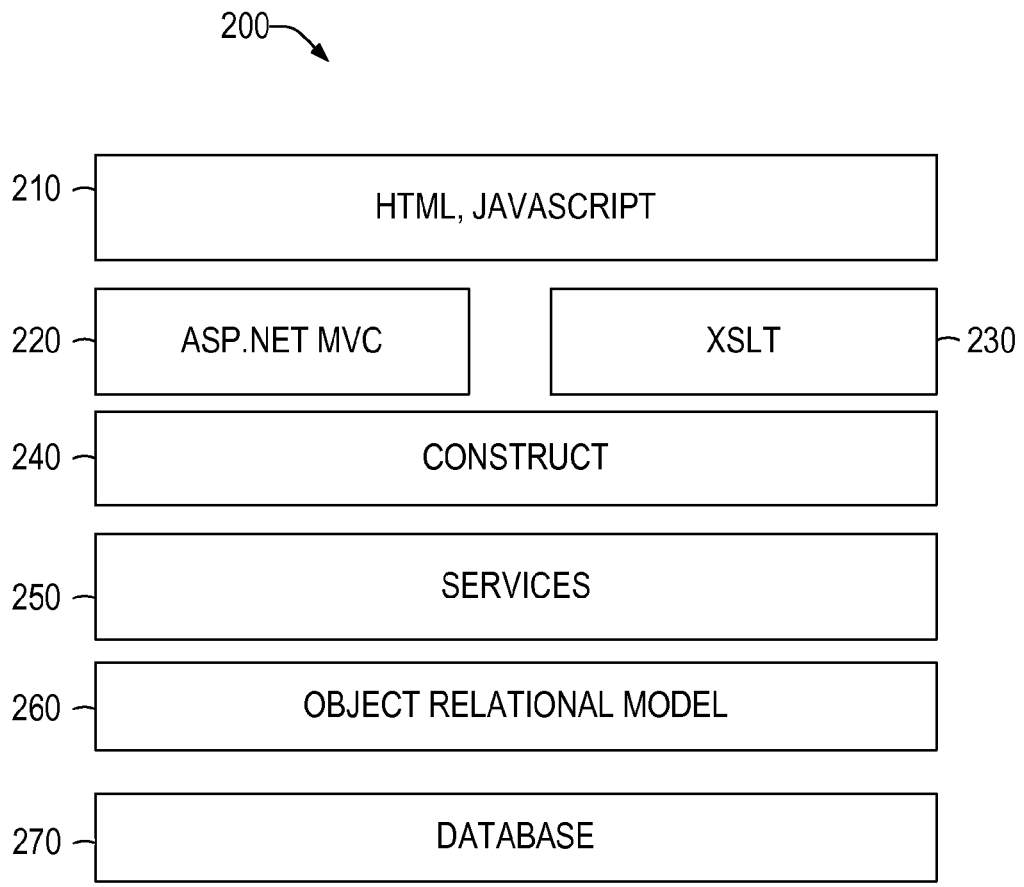
FIG. 2 is a block diagram depicting an example accounting application framework for the accounting platform, according to some embodiments.

FIG. 2 is a block diagram depicting an example accounting application framework 200 for the accounting platform. The accounting application framework 200 may be an end-to-end web development framework enabling a "software as a service" (SaaS) product. The accounting application framework 200 may include a hypertext markup language (HTML) and/or JavaScript layer 210, ASP.Net Model-View-Controller (MVC) 220, extensible stylesheet language transformations (XSLT) 230, construct 240, services 250, object relational module 260, and database 270.

The HTML and/or JavaScript layer 210 provides client-side functionality, such as UI generation, receipt of user input, and communication with a server. The client-side code may be created dynamically by the ASP.NET MVC 220 or the XSLT 230. Alternatively, the client-side code may be statically created or dynamically created using another server-side tool.

The ASP.Net MVC 220 and XSLT 230 provide server-side functionality, such as data processing, web page generation, and communication with a client. Other server-side technologies may also be used to interact with the database 270 and create an experience for the user.

The construct 240 provides a conduit through which data is processed and presented to a user. For example, the ASP.Net MVC 220 and XSLT 230 can access the construct 240 to determine the desired format of the data. Based on the construct 240, client-side code for presentation of the data is generated. The generated client-side code and data for presentation is sent to the client, which then presents the data.

The services 250 provide reusable tools that can be used by the ASP.Net 220, the XSLT 230, and the construct 240 to access data stored in the database 270. For example, aggregate data generated by calculations operating on raw data stored in the database 270 may be made accessible by the services 250.

The object relational model 260 provides data structures usable by software to manipulate data stored in the database 270. For example, the database 270 may represent a many-to-one relationship by storing multiple rows in a table, with each row having a value in common. By contrast, the software may prefer to access that data as an array, where the array is a member of an object corresponding to the common value. Accordingly, the object relational model 260 may convert the multiple rows to an array when the software accesses them and perform the reverse conversion when the data is stored.

Figure 3:
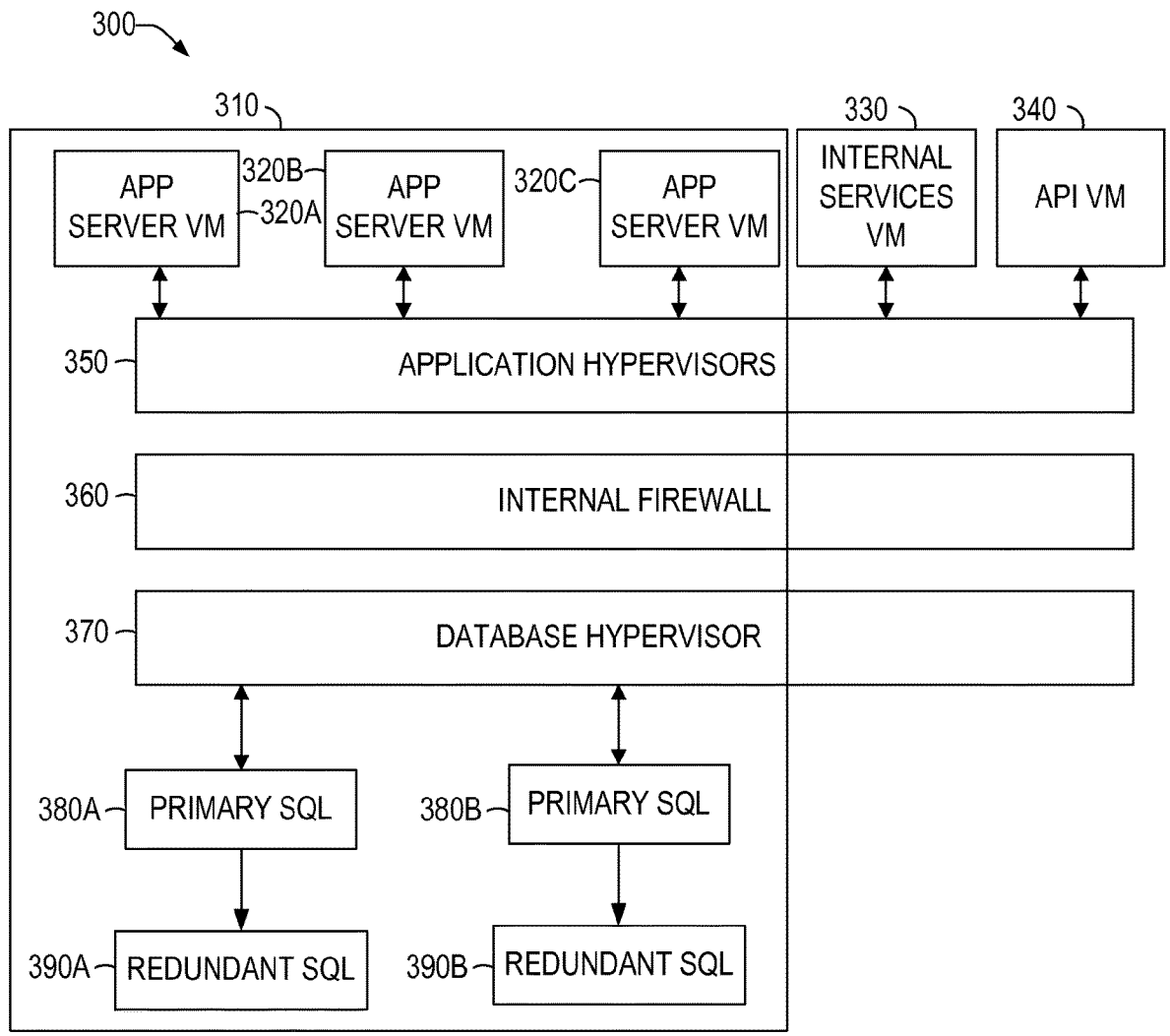
FIG. 3 is a block diagram depicting an example hosting infrastructure for the accounting platform, according to some embodiments.

FIG. 3 is a block diagram depicting an example hosting infrastructure 300 for the accounting platform. The platform may be implemented using one or more pods 310. Each pod 310 includes application server virtual machines 320 (shown as application server virtual machines 320a-320c in FIG. 3) that are specific to the pod 310 as well as application server virtual machines (VMs) that are shared between pods 310 (e.g., the internal services VM 330 and the application protocol interface VM 340). The application server virtual machines 320-340 communicate with clients and third-party applications via a web interface or an API. The application server virtual machines 320-340 are monitored by application hypervisors 350. An internal firewall 360 ensures that only approved communications are allowed between a database hypervisor 370 and the publically-accessible virtual machines 320-340. The database hypervisor 370 monitors the primary SQL servers 380a and 380b. The primary SQL servers 380a and 380b access the shared storage layer 450a or 450b (shown in FIG. 4) to read and write data generated by or used by the application server virtual machines 320-340. The redundant SQL servers 390a and 390b provide backup functionality for the primary SQL servers 380a and 380b, respectively.

The virtual machines 320-340 can be implemented using Windows 2008 R2, Windows 2012, or another operating system. The application and support servers supporting the virtual machines 320-340 can be built using spares for redundancy. The support servers can be shared across multiple pods 310. The application hypervisors 350, internal firewall 360, and database hypervisor 370 may span multiple pods 310 within a data center. In some example embodiments, each primary SQL server 380 and redundant SQL server 390 is configured to support 30,000-45,000 organizations. Accordingly, in embodiments using two such server pairs per pod 310, the pod capacity is 60,000-90,000 organizations. The redundant SQL servers 390 may take advantage of the "always on" resilience feature of SQL 2012.

Figure 4:
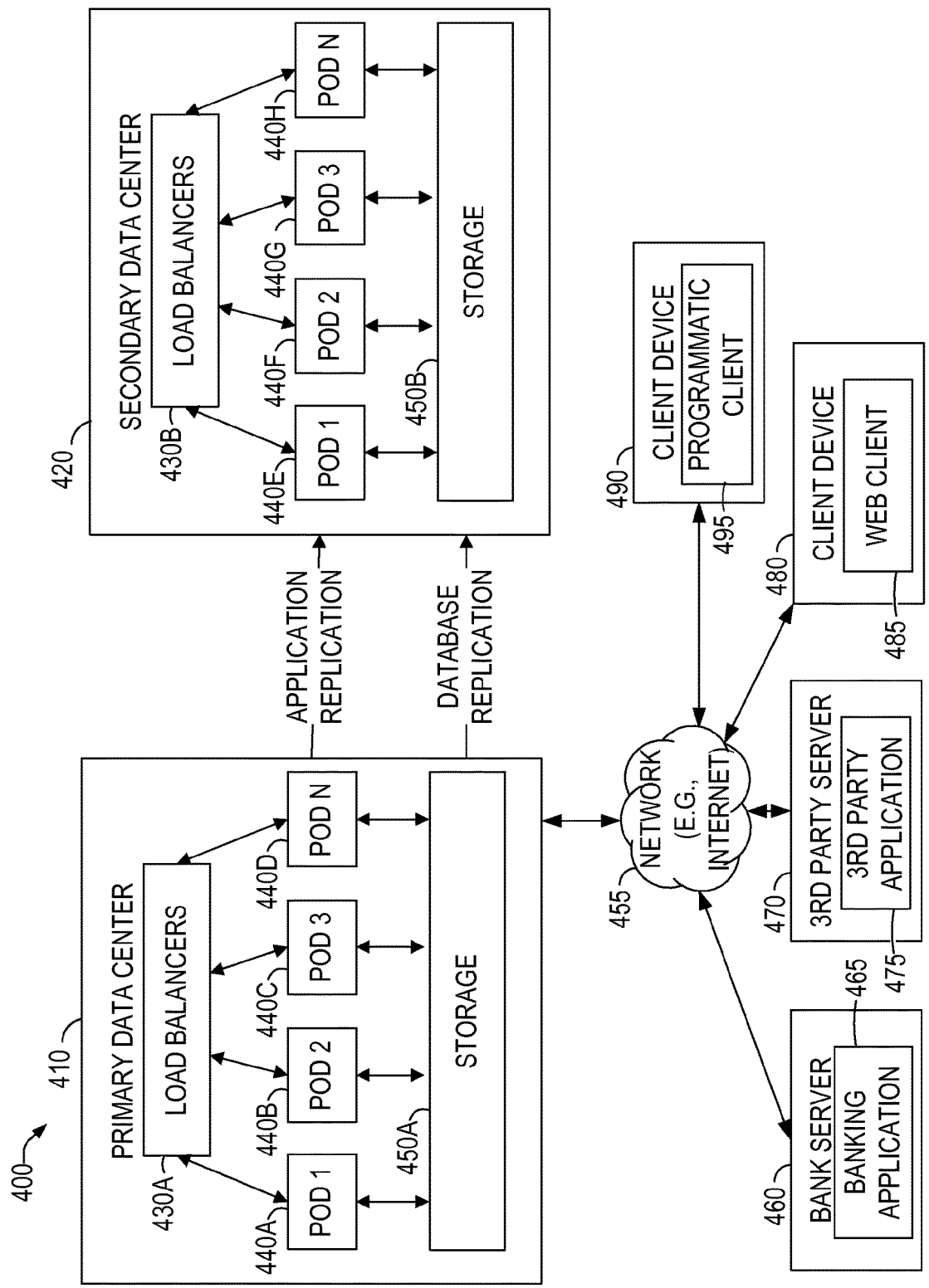
FIG. 4 is a block diagram depicting an example data center system of the accounting platform, according to some embodiments.

FIG. 4 is a block diagram depicting an example data center system 400 of the accounting platform interacting with other systems over a network. The primary data center 410 services customer requests and is replicated to the secondary data center 420. The secondary data center 420 may be brought online to serve customer requests in case of a fault in the primary data center 410. The primary data center 410 communicates over a network 455 with bank server 460, third party server 470, client device 480, and client device 490. The bank server 460 provides banking data (e.g., via the banking application 465). The third party server 470 is running third party application 475. Client devices 480 and 490 interact with the primary data center 410 using web client 485 and programmatic client 495, respectively.

Within each data center 410 and 420, a plurality of pods, such as the pod 310 of FIG. 3, are shown. The primary data center 410 is shown containing pods 440a-440d. The secondary data center 420 is shown containing pods 440e-440h. The applications running on the pods of the primary data center are replicated to the pods of the secondary data center. For example, EMC replication (provided by EMC Corporation) in combination with VMWare site recovery manager (SRM) may be used for the application layer replication. The database layer handles replication between the storage layer 450a of the primary data center and the storage 450b of the secondary data center. Database replication provides database consistency and the ability to ensure that all databases are at the same point in time.

The data centers 410 and 420 use load balancers 430a and 430b, respectively, to balance the load on the pods within each data center. The data centers 410 and 420 can be created using identical hardware to ensure that the performance of the secondary data center 420 is the same as the performance of the primary data center 410. The storage 450a and 450b may be implemented using one or more storage area networks such as the VNX storage area networks from EMC.

The bank server 460 interacts with the primary data center 410 to provide bank records for bank accounts of the client. For example, the client may provide account credentials to the primary data center 410, which the primary data center 410 uses to gain access to the account information of the client. The bank server 460 can provide the banking records to the primary data center 410 for later reconciliation by the client using the client device 480 or 490.

The third party server 470 may interact with the primary data center 410 and the client device 480 or 490 to provide additional features to a user of the client device 480 or 490. For example, a user may authorize the third party server 470 to access the user's data stored in the primary data center 410. The third party application 475 of the third party server 470 may use the user's data to generate reports, provide macros, or otherwise improve the user's ability to access or manipulate the user's data. The third party application 475 may communicate with the primary data center 410 via the network 455 using an API. The third party application 475 may communicate with the client device 480 or 490 using a web or programmatic interface.

Figure 5:
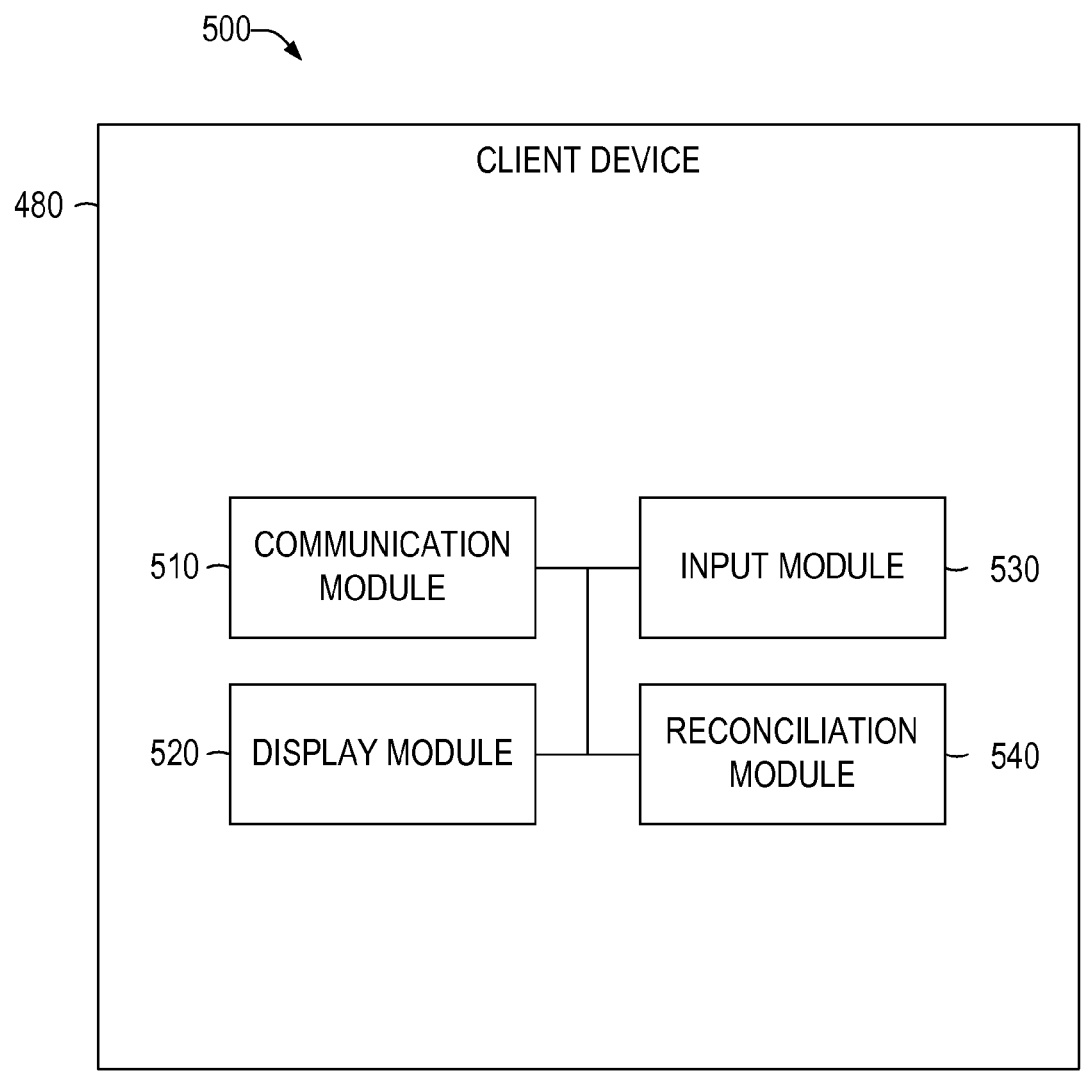
FIG. 5 is a block diagram depicting an example client device for accessing the accounting platform, according to some embodiments.

FIG. 5 is a block diagram 500 illustrating components of a client device suitable for mobile banking reconciliation, according to some example embodiments. The client device 480 or 490 is shown as including a communication module 510, a display module 520, an input module 530, and a reconciliation module 540, configured to communicate with each other (e.g., via a bus, shared memory, or a switch).

The communication module 510 may communicate with the primary data center 410, the third party server 470, the network 455, or any suitable combination thereof. Information received via the communication module 510 may be presented (e.g., displayed on a display device) via the display module 520. Information may be selected or search queries may be entered by a user of the client device 480 or 490.

A user interface is presented by the display module 520. The input from the user is detected by the input module 530. Commands received from the user by the input module 530 may be communicated to the primary data center 410 by the communication module 510. The communication module 510 may receive a response from the primary data center 410 that includes a set of banking records, a set of business records, associations between individual banking records and individual business records that indicate reconciliation between those records, and other data, in any combination.

The reconciliation module 540 can generate requests to the primary data center 410 to indicate that a banking record is reconciled by one or more business records. The request can be communicated to the primary data center 410 via the communication module 510, over the network 455.

Figure 6:
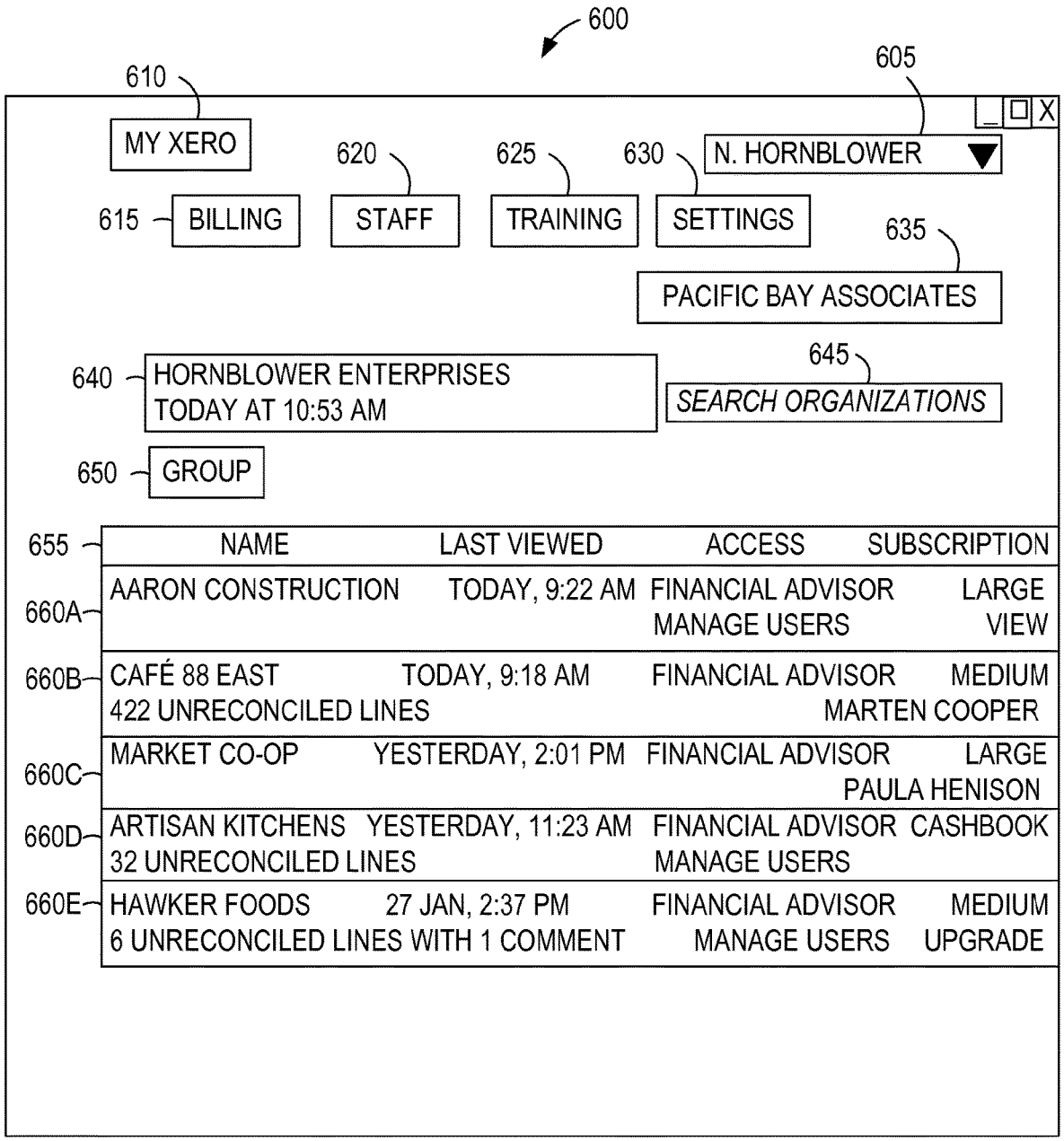
FIG. 6 is an interface diagram depicting an example user interface (UI) displaying accounts accessible by a user of the accounting platform, according to some embodiments.

FIG. 6 is an interface diagram depicting an example user interface 600 displaying accounts accessible by a user of the accounting platform. The elements 660a-660e are individual rows of data with information about different businesses and may be referred to collectively as elements 660. Similarly, an individual one of the elements 660 may be referred to as an element 660.

An element 605 shows the name of a logged-in user along with a downward-pointing arrow. The name or arrow may be operable to cause the display of a user profile menu. For example, the user may be able to change a contact email address, a password, and other individual information about the user.

An element 610 shows the name of the current application interface. In the example shown, the name is "My Xero." The element 610 may be used to distinguish between access by an organization (e.g., access via the organization access module 150) and access by an accounting practice (e.g., access via the practice studio 110).

Elements 615-630 may be operable to cause the display of additional user interface options. For example, element 615, labeled "Billing," may be operable to cause the display of a billing interface that allows the user to enter time-tracking information for use by the accounting and payroll module 132. The element 620, labeled "Staff," may be operable to bring up a staff interface that allows the user to control permissions for staff members. The functions of the staff interface may be implemented by the practice staff management module 114. The element 625, labeled "Training," may be operable to bring up a training interface that allows the user to schedule training sessions or review the results of training sessions. For example, the user may be enabled to set up a particular training session for a particular staff member. The element 630, labeled "Settings," may be operable to bring up a settings interface that allows the user to modify settings for the organization. For example, the organization may have a billing account on file that is used to pay for subscription access to the application. The settings interface can be used to add or change the billing account (e.g., using the billing/subscription management module 136).

Element 635 displays the name of the accountant for the organization. In some example embodiments, a logo for the accounting firm is also displayed.

Element 640 displays the currently selected organization and the last time data for the organization was updated.

Element 645 is a search box. The user may enter one or more search terms into the search box to cause the system to search for organizations matching the search terms.

Element 650, labeled "Group," allows the user to select multiple organizations and put them into a custom group. Operations may then be performed on the group. For example, a report pack may be run on every organization in a selected group.

Element 655 is a header for the elements 660 with information regarding organizations to which the user has access. The element 655 shows that each element 660 has a name, a date on which it was last viewed, an access permission, and subscription data. For example, the name of the organization for element 660a is Aaron Construction. Element 660a further shows that Aaron Construction was last viewed today at 9:22 AM. As also shown in element 660a, the current user is a financial advisor for Aaron Construction, and has the appropriate access privileges to manage users. Similarly, element 660a shows that Aaron Construction has a "Large" subscription. The word "View" in the element 660a may be operable to view subscription information for Aaron Construction.

Additional information about the available organizations may be shown in the elements 660. For example, the elements 660b, 660d, and 660e each show a number of unreconciled lines. This may suggest to the user that further reconciliation of banking and business records is needed for the corresponding organizations: Cafe 88 East, Artisan Kitchens, and Hawker Foods.

The elements 660 show at least a subset of the accounts to which the user has access. For example, the accounts may be associated with one or more organizations for which the user manages a business. The user may click on a link associated with one of the businesses to access and manage accounting information associated with that business.

FIG. 7 is an interface diagram depicting an example user interface 700 creating an invoice from a business. The user interface 700 includes elements 710-790, discussed in more detail below, and may be presented to a business user for creating an invoice for a customer.

Element 710 is a button operable to create the invoice according to the options selected and information entered by the business user in the other elements of the UI 700. For example, operation of element 710 may cause the payment initiator to contact the customer (e.g., by email, text message, over a social network, and so on) with information regarding the invoice. For example, an HTML, web link may be provided to the customer, operable to cause the display of UI 800, shown in FIG. 8. In some example embodiments, element 710 is also operable to save the work in progress on an invoice without actually sending the invoice to the customer. Alternatively or additionally, another element is used to save the work in progress.

Element 720 displays the total amount of the invoice. The currency in which the total is denominated may be determined by a setting of the business user (e.g., to denominate all invoices in dollars), determined automatically based on the address of the business user (e.g., to denominate invoices in New Zealand dollars based on the business user's address being in New Zealand), determined by a setting of the customer (e.g., to denominate all invoices for the customer in Euros), determined automatically based on an address of the customer (e.g., to denominate invoices to the customer in Rubles based on the customer's address being in Russia), determined by a per-customer setting of the business user (e.g., to denominate all invoices for the customer from this business in Pesos), or any suitable combination thereof (e.g., to denominate invoices in an automatically-determined currency unless overridden by an explicit setting).

Element 730 displays the name of the customer. Element 730 may be implemented as a drop-down list or other selector, enabling the business user to select the customer.

Element 740 displays the type of invoice. Element 740 may be implemented as a drop-down list or other selector, enabling the business user to select the type of invoice.

Element 750 displays a logo for the business. For example, the element 750 shows an oversized and italicized version of an example company name, "Demo Co." Element 750 may be operable to cause the upload of an image file to use for the logo. For example, clicking on element 750 may cause the presentation of a file selector interface. The business user can then select an image file to use for the logo. After selecting the file, the file is transferred to the server and the image or text shown in element 750 is replaced by the uploaded image. Other ways of selecting or uploading images may also be used. In some example embodiments, text, either formatted or plain, is used in addition to or in place of an image.

Element 760 shows the mailing address of the customer. The information in element 760 may be automatically generated based on the selection of the customer using element 730. Alternatively or additionally, the business user may be enabled to edit or populate the information in element 760. For example, element 760 may be a text field, directly editable by the business user. As another example, a selection of element 760 can be detected. Responsive to the selection, an editing interface may be presented to the business user. After editing the address information for the customer, the customer's address may be updated for the business user. When editing a later invoice for the same customer, the updated address may be retrieved.

Element 770 shows metadata regarding the invoice. As shown, element 770 includes an invoice number, a reference name, a goods and services tax (GST) number, an issued date, and a due date. Some or all of the metadata may be automatically generated. For example, the invoice number may be generated by automatically incrementing the most recently used invoice number. As another example, the GST number of a business may be the same for all customers, and populated from information about the business in a database. Similarly, the issued date may be pre-populated with the current date, and the due date may be calculated based on a pre-determined grace period (e.g., 30, 60, or 90 days). Optionally, some or all of the metadata may be created or edited by the business user.

Element 780 shows item detail data for the invoice. For each item, a description, a quantity, a unit price, and an amount is shown. Selecting an item description may cause a drop-down menu or other selector to appear. Using the selector, a different item may be chosen. When a different item is chosen, the description, unit price, and amount may be automatically updated. For example, if the "Golf balls— white single" with a unit price of 4.87 is replaced by "Golf balls—black triple" with a unit price of 15.00, the amount can be automatically calculated as 600.00, based on the unchanged quantity and updated unit price. In some example embodiments, the description, quantity, and unit price fields allow for direct entry of data, instead of or in addition to selection of items from an item database. The unit price for each item may be converted automatically from a currency in which the price is stored to the currency being used for the invoice. For example, if the unit prices are stored in a database denominated in NZD, but the invoice is being generated in US dollars, a current exchange rate between the two currencies can be accessed and used to convert the price.

Also shown in element 780 is an icon in the lower right-hand corner. The icon may be operable to cause the addition of an additional row of item data to the invoice. In some example embodiments, a blank row is added to the invoice each time the last row is used, allowing the business user to add items as needed.

Element 790 shows total detail data for the invoice. As shown in element 790, the subtotal, GST, and amount due are shown. The specific line items shown in element 790 may vary based on the location of the business user, the location of the customer, and business user options. For example, one business may choose to include a shipping cost as an item included in the subtotal while another business may choose to include the shipping cost as an additional charge included in the total but excluded from the subtotal. The subtotal may be determined by summing the amounts shown in element 780. Accordingly, subtotal may be automatically updated whenever an item is added or changed in the element 780. Alternatively or additionally, a UI element operable to cause the updating may be presented. The GST may be calculated based on tax rules for the location of the business. The amount due may be determined by summing the line items in element 790.

A business using the online accounting software may have the ability to present online invoices to their customers, making the invoicing process more efficient. The business may send out an invoice and know when it has been seen by the customer. If a business has set up a payment service, their debtor may make payment through the invoice.

FIG. 8 is an interface diagram depicting an example user interface 800 displaying an invoice from a business. The user interface 800 includes elements 805-870, described in more detail below. The UI 800 may be presented in response to an activation of a link sent to the user on request of the business expecting payment on the invoice. Alternatively, the UI 800 may be presented in response to a login by the user to the accounting system, based on a determination that the user has outstanding invoices to respond to. Multiple instances of the UI 800 may be presented in sequence when multiple invoices are pending. Alternatively, an additional UI (not shown) may be presented, allowing the user to select between the pending invoices.

Element 805 is a button, which a user (e.g., a business's customer) may select to be redirected to a bank site in order to pay the invoice. In the example shown in FIG. 8, the business Demo Co. (as shown by element 835) may be owed a particular amount for a good or service the business Demo Co. provided to their customer Bayside Club (as shown by element 845). The user interface 800 may present the invoice associated with this outstanding amount owed, and the customer may use the button 805 to initiate payment directly through the customer's bank account.

Element 810 displays the total amount of the invoice. Elements 815 and 820 are operable to cause the downloading or saving of the invoice in one of a variety of formats. For example, element 815 may be operable to select the format of the download (e.g., as portable document format (PDF), comma-separated value (CSV), text, Word, etc.), while element 820 may be operable to save the invoice in the selected format or a default format.

Element 830 may be operable to open a help or messaging interface that allows the user to gather information about bill payment in general, about invoices from the merchant specifically, or to send a message to the merchant.

Element 840 indicates the type of invoice (for example, a taxable transaction, a tax-exempt transaction, a charitable contribution, and so on).

Element 845 shows information regarding the customer such as name and mailing address. Similarly, element 850 shows information regarding the invoicing business, including the name and mailing address.

Element 855 shows the metadata of the invoice, including invoice number, reference, GST number of the invoicing business, date on which the invoice was issued, and date on which the invoice is due. Element 855 also shows the amount of time remaining before the invoice is due.

Element 860 shows the line items of the invoice, including, for each item, a description, a quantity, a unit price, and an amount. In embodiments, more or fewer information for each line item is shown.

Element 870 shows total detail data for the invoice. As shown in element 870, the subtotal, GST, and amount due are shown. The specific line items shown in element 870 may vary based on the location of the business user, the location of the customer, and business user options. The subtotal may be determined by summing the amounts shown in element 860. The GST may be calculated based on tax rules for the location of the business. The amount due may be determined by summing the line items in element 870.

When a user (e.g., debtor) receives an online invoice or payment request, the user may be presented with the UI 800 including element 805, which may include a link to a dialog listing participating banks. For example, if the user has not yet selected a default bank, the UI 900, shown in FIG. 9, may be presented in response to a selection of the "Pay Now" button (element 805) by the user. After setting a default bank, the user may be immediately redirected to the bank for payment of the invoice (e.g., as shown in the UI 1000 of FIG. 10), or returned to the UI 800. After a default bank has been set, operation of the element 805 may redirect the user's device to that bank for payment.

Figure 9:
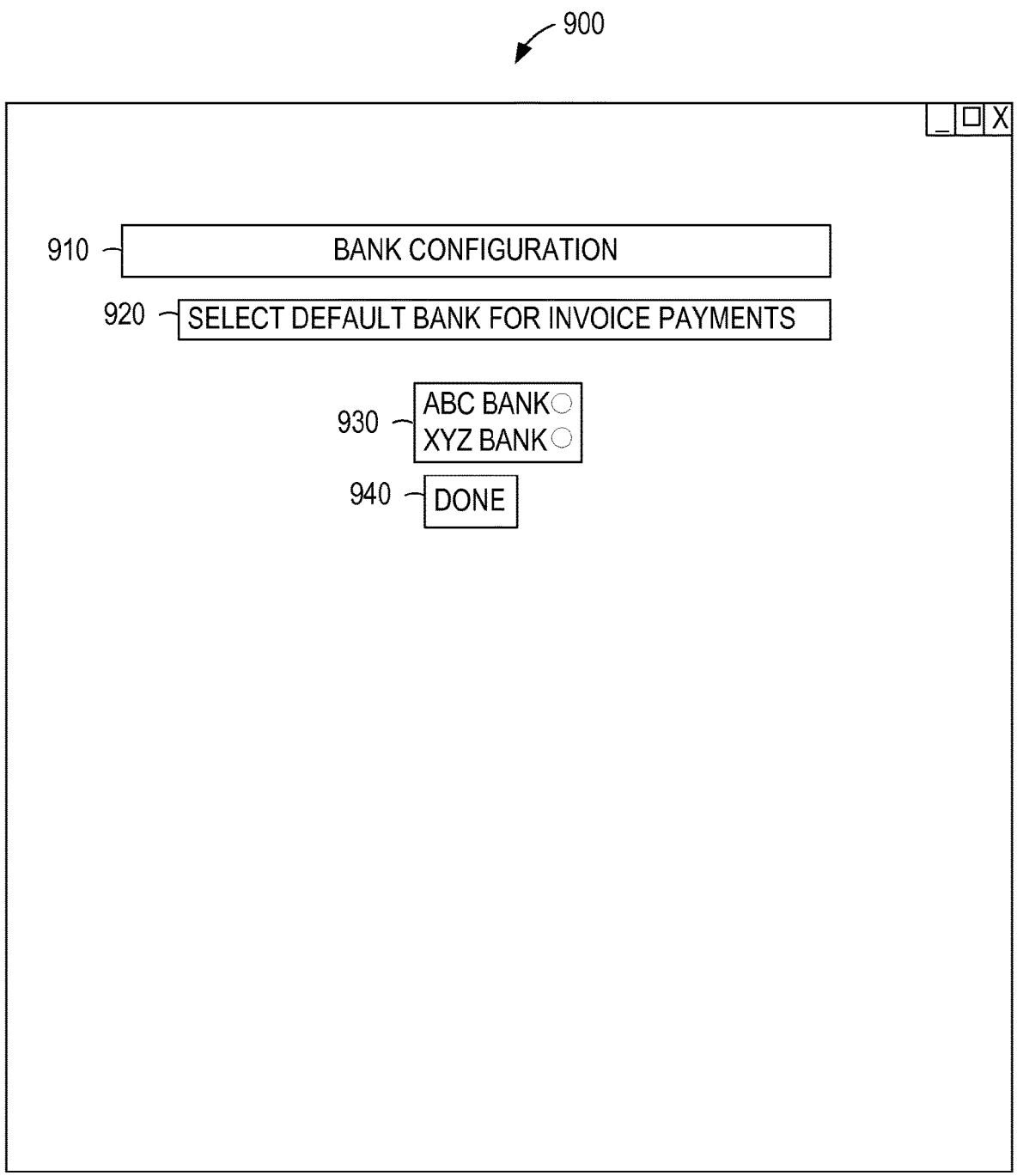
FIG. 9 is an interface diagram depicting an example user interface for configuring bank options, according to some embodiments.

FIG. 9 is an interface diagram depicting an example user interface 900 for configuring bank options for a customer. The UI 900 includes elements 910-940, as discussed in more detail below, and may be presented to a user during initial configuration, in response to receiving an invoice, or in response to a request from the user.

Element 910 is a title, showing that the user is currently on a "Bank Configuration" screen. Similarly, element 920 is an informational message, requesting that the user select a default bank for invoice payments.

Element 930 includes radio buttons to allow the user to select a bank from a list of banks for the user. In other example embodiments, a drop-down list or other selector is used. The set of banks available for selection may be the set of banks with which the payment initiator has exchanged encryption keys, a set of banks identified based on information about the user (e.g., the location of the user), a set of banks identified based on information about the transaction (e.g., the currency of the transaction), a set of banks identified based on information about the payee (e.g., the location of the payee or banks associated with the payee), or any suitable combination thereof. The set of banks may be accessed from a database, such as the database 380A or storage 450A.

Element 940 is a button operable to confirm the selected bank. For example, the user may select the radio button corresponding to "ABC Bank" shown in the element 930, then press the "Done" button of element 940 to save the selection. In other example embodiments, the choice of bank is made without a second confirmation action.

A cookie may be stored on the debtor's machine so that any subsequent invoices the debtor receives from the payment initiator will automatically invoke the preference to use their chosen bank to pay the invoice. This may be changed by the user selecting another bank and replacing the information stored in the cookie.

The payment mechanism through the direct bank transfer may be an endpoint exposed by a financial institution (and shared with a particular payment initiation partner) to which a debtor receiving a payment request is redirected, should they choose to pay using their bank. The direct bank transfer may avoid using a third-party intermediary, such as a credit card transaction service. The payment mechanism may accept the payment details, authenticate the online banking user into Internet banking, and may present the payment information for confirmation by the debtor. Benefits of this service may include:

Participating financial institutions have presence and utility in front of not only businesses, but a business's customers.

The financial institution processes the payment via Internet bill payment functions, rather than the payment being processed via scheme (e.g., credit card payment processing).

The financial institution controls who can present the payment functionality by requiring a signed and encrypted payment message that uses a key exchange.

Reduced merchant fees for the biller, and no merchant account requirement. For example, the merchant does not pay credit card fees on an ACH transaction.

Greater business satisfaction—merchant gets paid without charge-back concerns, customer can pay larger sums via Internet banking.

Drives debtor back into Internet banking rather than payment gateway.

Debtor is not forced to pay surcharge (becoming more common with payment gateways that collect payment via credit card)

Below is a table of entities that may be common to both the financial institution (FI) and the payment initiator (PI):

| Name | Source | Type | Description |
|---|---|---|---|
| | | | Global |
| FI Public Key | FI | Byte[ ] | Public Key for Financial Institution |
| PI Public Key | PI | Byte[ ] | Public Key for Payment Initiator |
| | | Provider | |
| ProviderCode | PI | String(50) | Used so that FI can recognize partner before decryption. |
| ProviderID | PI | String(50) | Used so that FI can confirm recognition of payment initiator after decryption. |

Below is a table of FI entities:

| Name | Source | Type | Description |
|---|---|---|---|
| | | | Global |
| FI Private Key | FI | Byte[ ] | Private Key for Financial Institution |

Below is a table of PI entities:

| Name | Source | Type | Description |
|---|---|---|---|
| | | | Global |
| PI Private Key | PI | Byte[ ] | Private Key for Payment Initiator |
| | | Payment | |
| AccountNumber | PI | String(50) | Payee's account number |
| DueDate | PI | Date | Date the payment is due. (ISO 8601) |
| Payee | PI | String(50) | Payee's name |
| Reference | PI | String(50) | Invoice reference |
| Amount | PI | Decimal | Amount to pay |
| Currency | PI | Char(3) | Currency (ISO 4217) |

Once a debtor has chosen their bank, the payment mechanism is handed over to the financial institution to complete. Transfer to the financial institution may be done via a secure hypertext transfer protocol (HTTPS) POST, triggered by the user clicking element 905 once a bank has been selected. In order to complete the payment, the user may authenticate with the bank using a valid Internet banking user account.

Data may be transferred from the payment initiator to the financial institution via the user's browser when the user chooses to make a payment. The data transferred may be sent in one direction, from the payment initiator to the financial institution. The communication protocol may be designed to avoid any server-to-server communication between the financial institution and payment initiators, meaning that virtual private networks (VPNs) or other secure infrastructure do not need to be implemented. The data is transferred via the user's web browser client, as an encrypted, signed blob contained within a JavaScript object notation (JSON) data structure.

The payment initiator assembles a blob of data containing information about the payment that the user wishes to make. This blob may contain payment details and other sensitive information, and hence is encrypted so the data within is opaque to the client browser transferring the data.

In some embodiments, the payment data may be transferred using the "Encrypt then MAC" pattern. A symmetric key may be randomly generated and used to encrypt the payment data. The payment initiator has the financial institution's public RSA key that may be used to encrypt the symmetric key. The financial institution may use its private RSA key to decrypt the symmetric key and in turn use it to decrypt the message.

The payment initiator may have a private RSA key that is used to sign messages sent to the financial institution. The financial institution may use the payment initiator's public RSA key to verify that the signature is valid.

Any suitable cryptographic algorithm may be used, such as AES for symmetric encryption, RSA for asymmetric encryption, RSA-SHA2 for signing, and the like. Additionally, for cryptographic keys generated and used in the system, any key sizes may be used (e.g., AES 256 bits, RSA 2048 bits, SHA 256 bits, etc.).

Any nonce and initialization vectors may be generated from a cryptographically secure random number generator. This ensures that the symmetric encryption will be strong and prevent brute force attacks against the encrypted data bytes in the message. In some embodiments, certain default random number generators may not be cryptographically secure. Thus, a cryptographically secure algorithm should be chosen (e.g. in C #, the System.Security.Cryptography.RandomNumberGenerator class should be used instead of the System. Random class).

The financial institution may store a private RSA key issued and held only by the financial institution (e.g., the financial institution's private key) and a public RSA key issued by the payment initiator (e.g., the payment initiator's public key). Similarly, the payment initiator may store a public RSA key issued by the financial institution (e.g., the financial institution's public key) and a private RSA key issued and held only by payment initiator (e.g., the payment initiator's private key).

Packaging a message to send to the financial institution may occur in a variety of manners. For example, the payment initiator may use the following algorithm and/or pseudo-code to package a message for receipt by the financial institution. The JSON Payment containing the sensitive data may be encrypted and signed, and the resulting MessageContainer may be sent to the financial institution as a JSON data structure via the user's browser.

| | |
|---|---|
| PlainTextDataString = | Base64Encode(Payment) |
| IVBytes = | GenerateRandomIV( ) |
| EncryptedIV = | RSAEncrypt(IVBytes, FI_PubKey) |
| RandomKeyBytes = | GenerateRandomKey( ) |
| EncryptedRandomKey = | RSAEncrypt(RandomKeyBytes, FI_PubKey) |
| EncryptedDataBytes = | AESEncrypt(PlainTextDataString, RandomKeyBytes, IVBytes) |
| SignatureBytes = | Calculate SHA2Signature( EncryptedIV + EncryptedRandomKey + EncryptedDataBytes, PI_PrivKey) |
| MessageContainer.PC = | "PROVIDER/XERO" |
| MessageContainer.EIV = | Base64Encode(EncryptedIV) |
| MessageContainer.ERK = | Base64Encode(EncryptedRandomKey) |
| MessageContainer.Data = | Base64Encode(EncryptedDataBytes) |
| MessageContainer.S = | Base64Encode(SignatureBytes) |
| MessageContainer.SM = | "RSA-SHA2" |

Verifying and unpackaging a message upon receipt by the financial institution may occur in a variety of manners. For example, upon the receipt of a message from a payment initiator, the financial institution may decrypt and unpack the message to ensure it has come from an approved payment initiator and has not been tampered with. The following algorithm and/or pseudo-code may be used to unpack the MessageContainer and receive the Payment.

```
EncryptedIV =              Base64Decode(MessageContainer.EIV)
EncryptedRandomKey =       Base64Decode(MessageContainer.ERK)
EncryptedDataBytes =       Base64Decode(MessageContainer.Data)
SignatureBytes =           Base64Decode(MessageContainer.S)
(Check MessageContainer.SM == "RSA-SHA2")
VerifySignatureBytes =     CalculateSHA2Signature(
                                EncryptedIV + EncryptedRandomKey +
                                EncryptedDataBytes,
                                PI_PubKey)
(Check VerifySignatureBytes == SignatureBytes)
IVBytes =                  RSADecrypt(EncryptedIV, FI_PrivKey)
RandomKeyBytes =           RSADecrypt(EncryptedRandomKey,
                                FI_PrivKey)
PlainTextDataString =      AESDecrypt(EncryptedDataBytes,
                                RandomKeyBytes, IVBytes)
AccountMapMessage =        Base64Decode(PlainTextDataString)
```

The financial institution may then validate the internals of the payment to check that it has integrity. For example, this may include:

Check Payment.ProviderID matches MessageContainer.PC

TimeStampUTC is within the tolerance for valid messages, and the message has not expired The (TimeStampUTC, Nonce) have not been used by the Payment Initiator, to check the message is not a replay attempt Other validation of message contents Once the verification and unpackaging operations are successfully completed, the user may be shown displays allowing the user to continue to proceed with an Internet payment via internet banking.

The example message encryption and packaging described above may allow messages to pass from the payment initiator to the financial institution over an untrusted communication mechanism (the user's browser).

The encryption and signing provide guarantees that the payment initiator legitimately generated the message, the message was not tampered with or viewed in transit, and the message cannot be replayed. The payment initiator can also be assured that only the financial institution will be able to decrypt the data.

Other Security Issues Include:

Spoofing: It may not be possible for anyone other than the online accounting software server to generate a valid message due to the use of the public/private key pair shared between the online accounting software server and the Financial Institution. Any other keys used for encryption may fail the signature verification step.

Repudiation: The payment initiator may sign the data using their private key, which is kept secret and held only by them. When the FI receives the message and checks the signature using the PI's public key, they can be assured the PI originally generated the message.

Tampering: The signature check may also prevent tampering in transit. If the initialization vector (IV), key or data is altered, then the signature check will fail.

Information Disclosure: The payment may contain some sensitive information, such as amounts and account numbers. This may be encrypted using a one-time-use encryption key. The encryption key may be transmitted in the message, but may be encrypted asymmetrically using the FI's public key, which only the FI can decrypt.

Replay: Replay attacks may be prevented by a timestamp and nonce value that allows the FI to guarantee it will receive and process a given message only once. If a message arrives with the same timestamp and nonce, the FI may reject the message.

Man-in-the-middle (MiTM): It may be possible for an attacker to intercept the generated JSON from the payment initiator and forward it to the FI before the legitimate user is able to. This may be mitigated by secure socket layer/transport layer security (SSL/TLS) connections being used in the user's browser, preventing MiTM on the client side, and the use of a short expiration against the message timestamp. As the user will not need to perform any action between the message generation and the immediate POST to the FI, the expiration can be kept short.

Denial of Service: This protocol may not provide protection against denial of service; an attacker could send large, malformed, or numerous messages to the FI endpoint and cause a costly signature check or decryption process to occur. This should be mitigated by using the FI's standard brute force detection mechanisms.

Elevation of Privilege: The message transferred from the payment initiator to the FI may not convey privileges from one environment to the other. The user may still have to authenticate independently with the FI institution site in order to have the option to complete a payment.

An example message sent from the initiator to the financial institution may include the following payment information:

| Name | Type | Description |
| --- | --- | --- |
| ProviderID | String(50) | FI's identifier for the payment initiator |
| Currency | Char(3) | ISO4217 currency code for the payment |
| AccountNumber | String(50) | Payee's supplied account number. (Numerals only) |
| DueDate | Date | Date payment is due (ISO 8601) |
| Payee | String(50) | Payee name |
| Reference | String(50) | Payees's invoice reference |
| Amount | Decimal | Amount to pay |
| TimestampUTC | DateTime (e.g. "2000-12-29T00:00:00Z") | The time that the message was constructed by the caller. Used to expire messages that have passed a timeout threshold. ISO 8601 |
| Nonce | String(255) | The Nonce value should be unique for all requests with that TimestampUTC. The nonce allows the server to verify that a request has never been made before and helps prevent replay attacks. The server will cache all (ProviderID, TimestampUTC, Nonce) tuples until after the expiration of the messages, and reject any un-expired messages that have already been received. |
| ReturnURL | String(255) (Well-formed absolute uniform resource locator (URL)) | A URL to redirect the user to, upon completion of the payment process. |

An example JSON value for the payment message may be as follows:

```
{
    "ProviderID": "PROVIDER/XERO",
    "Currency": "NZD",
    "AccountNumber": "01013703294839400",
    "DueDate": "2013-07-23",
    "Payee": "Demo Company",
    "Reference": "INV-01234",
    "Amount": 124.32,
    "TimestampUTC": "2012-12-10T00:00:00",
    "Nonce": "A7813747-C47A-496E-8DE6-682D16A457D2",
    "ReturnURL": "https://www.xyz.com/"
}
```

An example message (e.g., MessageContainer) that may be sent from the payment initiator to the financial institution via the user browser may include the following:

| Name | Type | Description |
| --- | --- | --- |
| PC | String(50) | FI's identifier for the payment initiator |
| Data | Byte[ ] | An encrypted blob of data |
| ERK | Byte[ ] | Encrypted Random Key The key used to encrypt/decrypt the data blob. Should be encrypted with FI's public key. |
| EIV | Byte[ ] | Initialization Vector used when encrypting data. Should be encrypted with FI's public key. |
| S | Byte[ ] | The signature calculated when running the request signing method over the Encrypted IV, Encrypted Random Key and Data fields. |
| SM | String(50) | The method used to calculate the message signature. If not specified, the default of "RSA-SHA2" is assumed. |

Each Byte[ ] array may be transmitted as a Base 64 encoded string when rendered as JSON. An example JSON value for the MessageContainer may be as follows:

```
{
    "PC": "PROVIDER/XERO",
    "Data": "qas43...==",
    "ERK": "Rxut...==",
    "EIV": "QEDF...==",
    "S": "zyw...==",
    "SM": "RSA-SHA2"
}
```

The payment mechanism provided by the online accounting software server may facilitate sending payment from the payment initiator to the financial institution for the authenticated internet banking user to pay. Once the user has been redirected from the payment initiator to the financial institution, and the appropriate information has been passed, this action may be completed within the financial institution. The user may be presented with the payment details, and the user may elect to pay. Implementation of this functionality may be left up to the financial institution.

In some embodiments, certain preconditions may be required before the financial institution will present the proposed transaction to the customer, such as:
The user is authenticated with the FI.
The ProviderCode is recognized.
The random key can be decrypted with the FI's private key.
The request data can be decrypted with the random key.
The signature is verified with the financial institution's public key.
The ProviderID is a valid provider.
The nonce has not been used before.
The data is able to be parsed and all required elements included.
Full payment information is provided.
The timestamp is within a valid timeout period.

In some embodiments, certain post-conditions may be required. For example, approval of the payment by the customer may be required before processing the payment continues.

Figure 10:
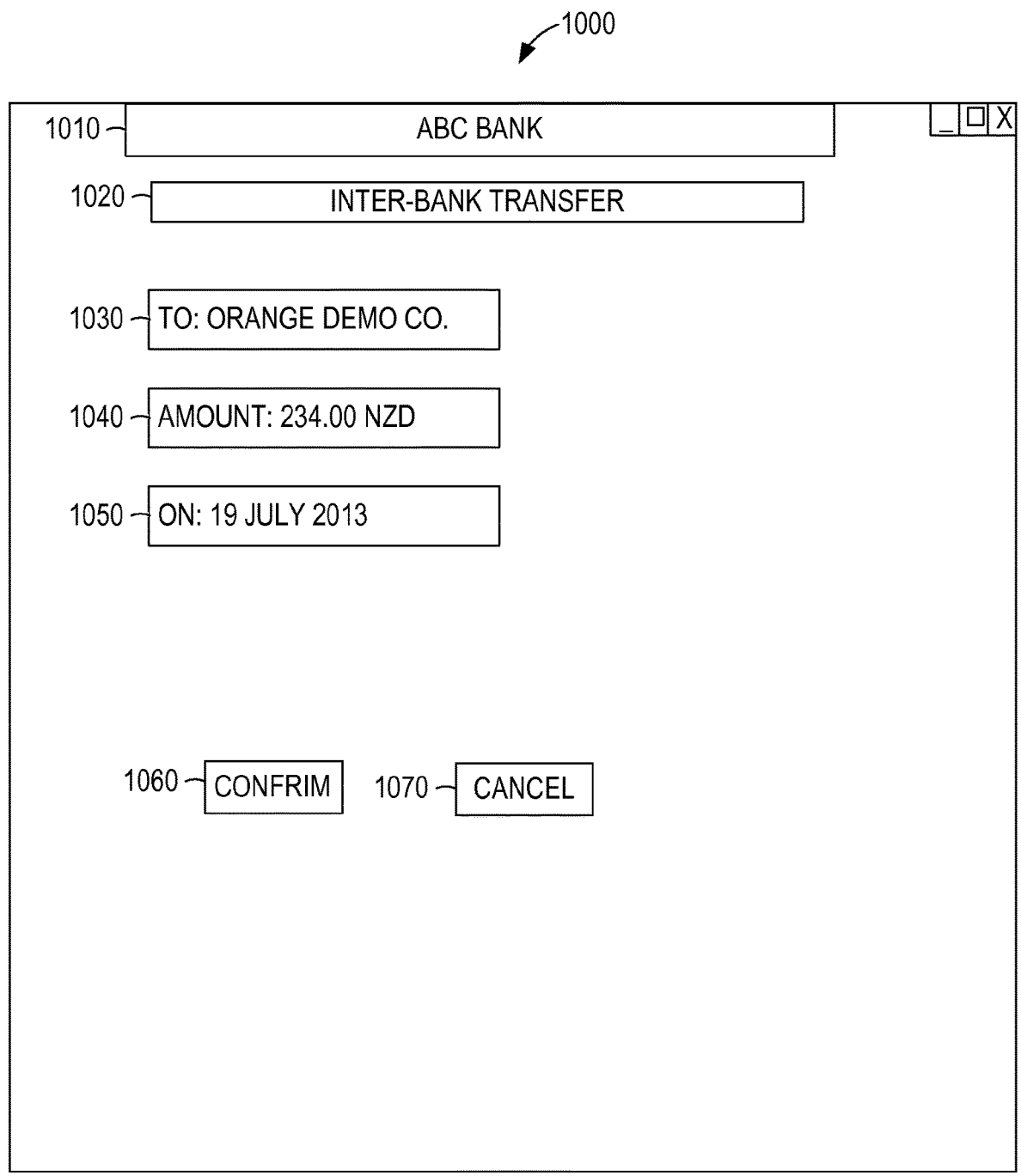
FIG. 10 is an interface diagram depicting an example user interface for paying an invoice from a business, according to some embodiments.

FIG. 10 is an interface diagram depicting an example user interface 1000 for paying an invoice from a business, according to some embodiments. The user interface 1000 includes elements 1010-1070, as discussed below.

Element 1010 is a title, showing that the user is currently viewing information provided by "ABC BANK." Similarly, element 1020 is a description, showing that the user is viewing a page for "INTER-BANK TRANSFER."

Elements 1030-1050 show the payee (e.g., the business that sent the invoice using the UI 700), the amount (e.g., the amount of the invoice), and the payment date (e.g., the current date or the due date of the invoice). In some example embodiments, one or more of the payee, the amount, and the payment date are modifiable by the user. In other example embodiments, the user is not allowed to modify the fields.

Element 1060 is a button operable to confirm the details shown in elements 1030-1050, and operable to cause the financial institution to transfer the amount shown in element 1040 from the customer's account to the business's account shown in element 1030 on the transaction date shown in element 1050. The financial institution may communicate with the payment initiator to inform the payment initiator that the payment was made or is scheduled to be made on the payment date. Alternatively or additionally, the financial institution may inform the payment initiator that the payment was successfully completed after the transfer of funds is complete.

Element 1070 is a button operable to cancel the transfer of funds. In some example embodiments, the payment initiator is informed that payment was not completed. The payment initiator may send one or more additional messages to the user to remind the user of the outstanding invoice.

Figure 11:
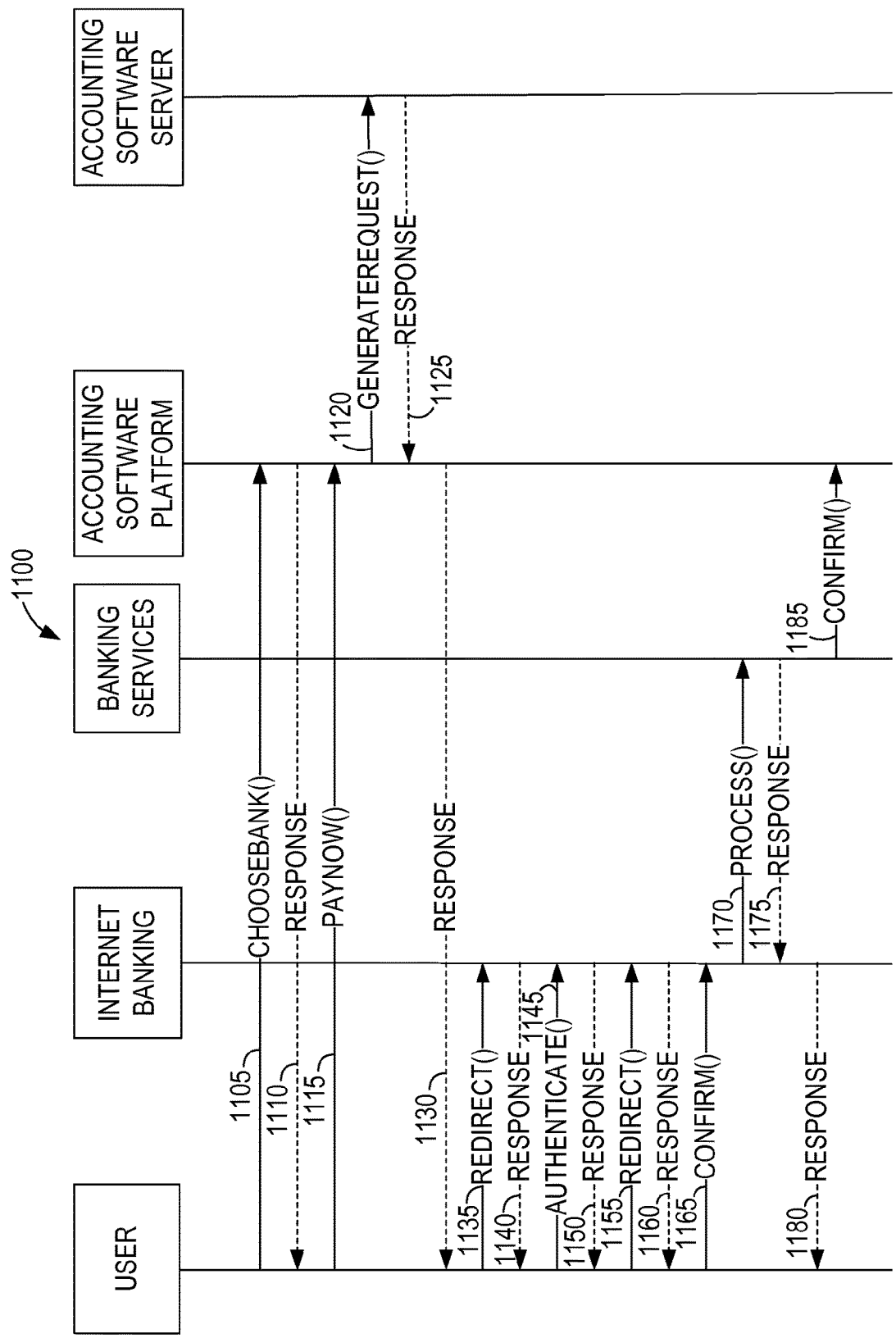
FIG. 11 is a block diagram depicting the flow of data between entities facilitating a transfer of funds, according to some embodiments.

FIG. 11 is a block diagram depicting the flow of data between entities facilitating a transfer of funds, in an example embodiment. As shown in FIG. 11, the user may interact with the accounting software platform to choose the bank to make payment with. For example, the UI 900 of FIG. 9 may be used to make the bank selection, and the selected bank sent to the accounting software platform via a ChooseBank function 1105. The accounting software platform provides a response 1110 to the user. The response may be in the form of a web page informing the user that the bank selection was successfully made. The user then chooses to pay the invoices via a PayNow function 1115 (e.g., by activating element 805 of FIG. 8). After receiving the payment command from the user, the accounting software platform generates request 1120 to the accounting software server. The accounting software server responds by creating an encrypted block of data that includes the information for the user's bank and an invoice to be paid and sending the encrypted block of data in the response 1125. The response 1130 from the accounting software platform to the user also includes this data, along with an address for redirection. For example, the received web page may include an HTML, meta tag that causes the page to refresh from a different URL.

Accordingly, the user is redirected 1135 to the internet banking site. The internet banking site sends a response 1140, such as a welcome or login web page. The user sends authentication data to the internet banking site, such as a user name and password. The internet banking site sends a response 1150, such as an acknowledgement that the user authentication was successful, along with a redirection address to another page within the internet banking site at which the invoice can be paid. The user is redirected 1155 to the new page, and receives the page in response 1160 from the internet banking server. The response page may include information about the transaction and request for confirmation from the user to pay the invoice. The user submits the confirmation 1165 to the internet banking server, which generates a request to process 1170 the payment to the banking services server. The banking services server initiates the processing of the payment and sends an appropriate response 1175 to the internet banking server. The internet banking server sends a response 1180 to the user. For example, the user may be presented with a web page indicating that the invoice payment was successful.

The banking services server or internet banking server sends a confirmation 1185 to the accounting software platform or accounting software server to inform the accounting software that the invoice has been paid. Accordingly, when the entity that generated the invoice next accesses the accounting software, the entity can be informed that payment was received.

Figure 12:
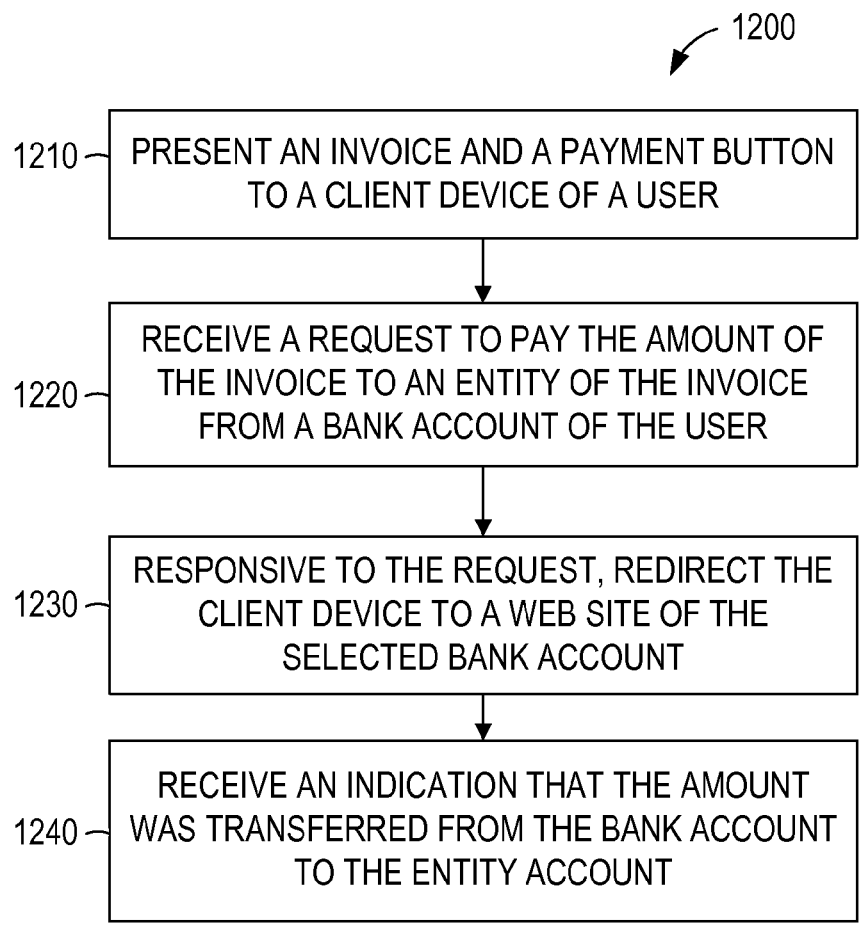
FIG. 12 is a flowchart of an example method for facilitating direct bank transfers, according to some embodiments.

FIG. 12 is a flowchart of an example method 1200 for facilitating direct bank transfers.

In operation 1210, the online accounting software server may present an invoice and a payment button (such as those shown in FIG. 8) to a client device of a user (e.g., a customer of a business). The invoice may identify an amount owed by the user to the business. The payment button may be associated with an option to pay the amount to the business through a particular bank of the user. The particular bank to be used may be selected by the user.

In operation 1220, the online accounting software server may receive, from the client device, a request to pay the amount through the user's account with the particular bank selected. The request may be made using the payment button.

In operation 1230, the request may be used by the online account software server to redirect the client device to a website of the particular bank selected, such that the particular bank may determine the validity of the request to pay the amount through the user's account and may transfer the amount from the user account to the business's bank account.

In operation 1240, the online accounting software server may receive an indication indicating the amount was transferred from the user account to the business's bank account. The indication may have been sent from the bank selected by the user, from which funds were transferred. Alternatively or additionally, the indication may have been sent from the bank of the business, to which funds were transferred.

Figure 13:
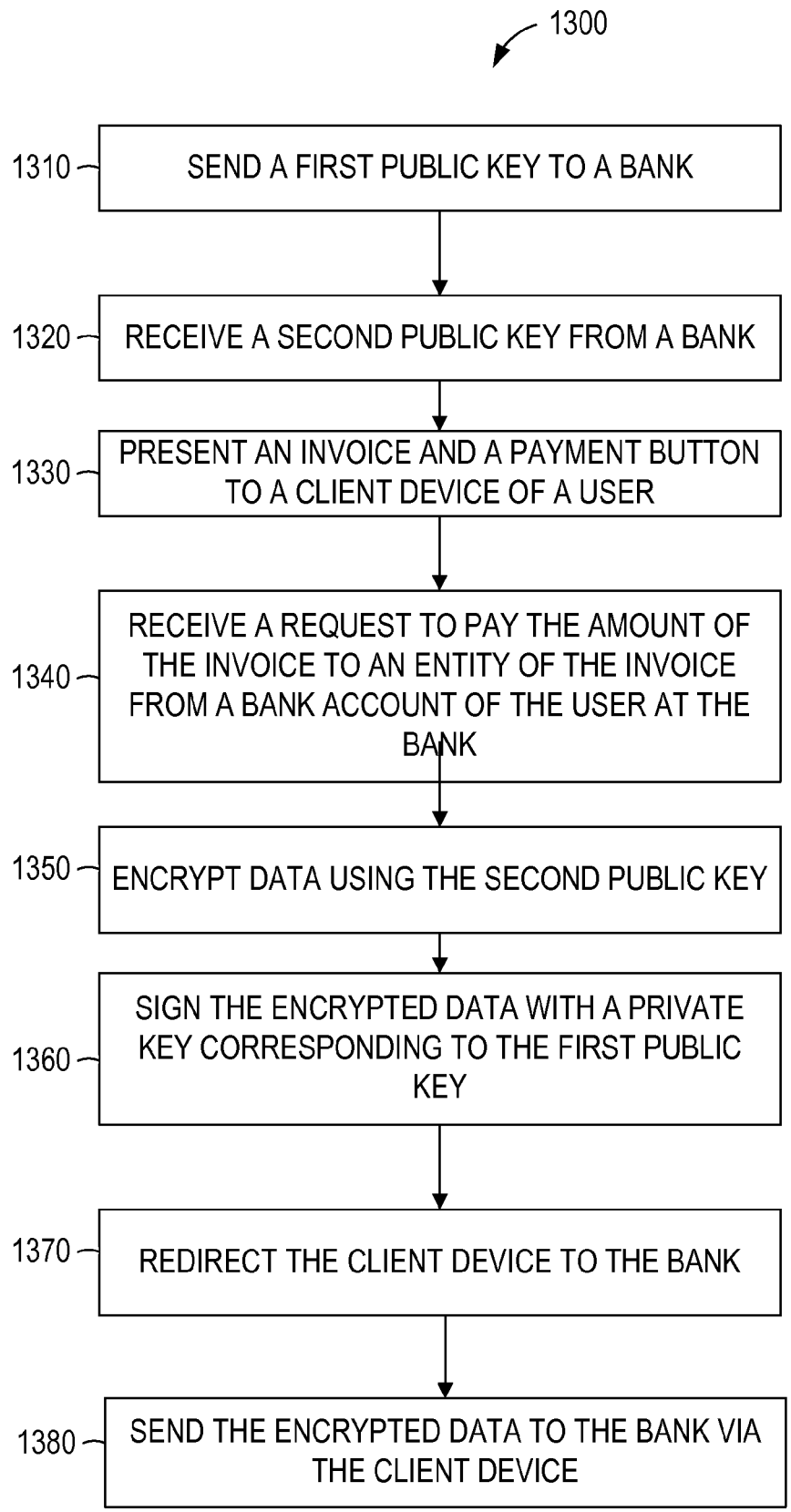
FIG. 13 is a flowchart of an example method for facilitating direct bank transfers, according to some embodiments.

FIG. 13 is a flowchart of an example method 1300 for facilitating direct bank transfers.

In operations 1310 and 1320, the payment initiator and a bank exchange public keys. For example, the payment initiator and the bank may exchange public keys via email.

In operation 1330, the payment initiator presents an invoice with a payment button at a client device of a user. For example, the payment initiator may send a web page to a web browser on a client device. As another example, the payment initiator and the client device may interact through a programmatic interface, such as an API, to cause the presentation of the invoice and payment button to the user.

In operation 1340, the payment initiator receives a request to pay the invoice. For example, the user may press the payment button, causing an HTTP or API message to be sent to the payment initiator. The request may include information about a user's bank account at the bank, or an indication usable by the payment initiator to access the user's bank account information in a database of the payment initiator.

In operations 1350 and 1360, the payment initiator encrypts a data packet using the bank's public key and signs the data packet with the payment initiator's private key. The data packet includes information usable by the bank to process the payment of the invoice. For example, the data packet may include an account number of the user, account information of the entity presenting the invoice, a timestamp for when the data packet was created, a valid duration for the request or timestamp for when the data packet expires, an amount of the invoice, and so on.

In operation 1370, the payment initiator redirects the client device to the bank. For example, if the client is connected to the payment initiator via a web connection, the client's web browser can be directed to load a web page from a website of the bank. As another example, if the client is connected to the payment initiator via an application interface, an application of the bank on the client device may be started for the user.

In operation 1380, the encrypted data is sent from the payment initiator to the bank via the client device. For example, the encrypted data can be sent to the client device from the payment initiator. After the client has been redirected to the bank, or as part of the redirection process, the bank receives the encrypted data from the client device.

After receiving the encrypted data, the bank decrypts the data using the payment initiator's public key and the bank's private key. Based on the information in the data, the bank presents a user interface to the user, allowing the user to confirm payment. The UI presented to the user may be prepopulated with information from the invoice, such as the amount and the payee, based on the information extracted from the encrypted data.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 14:
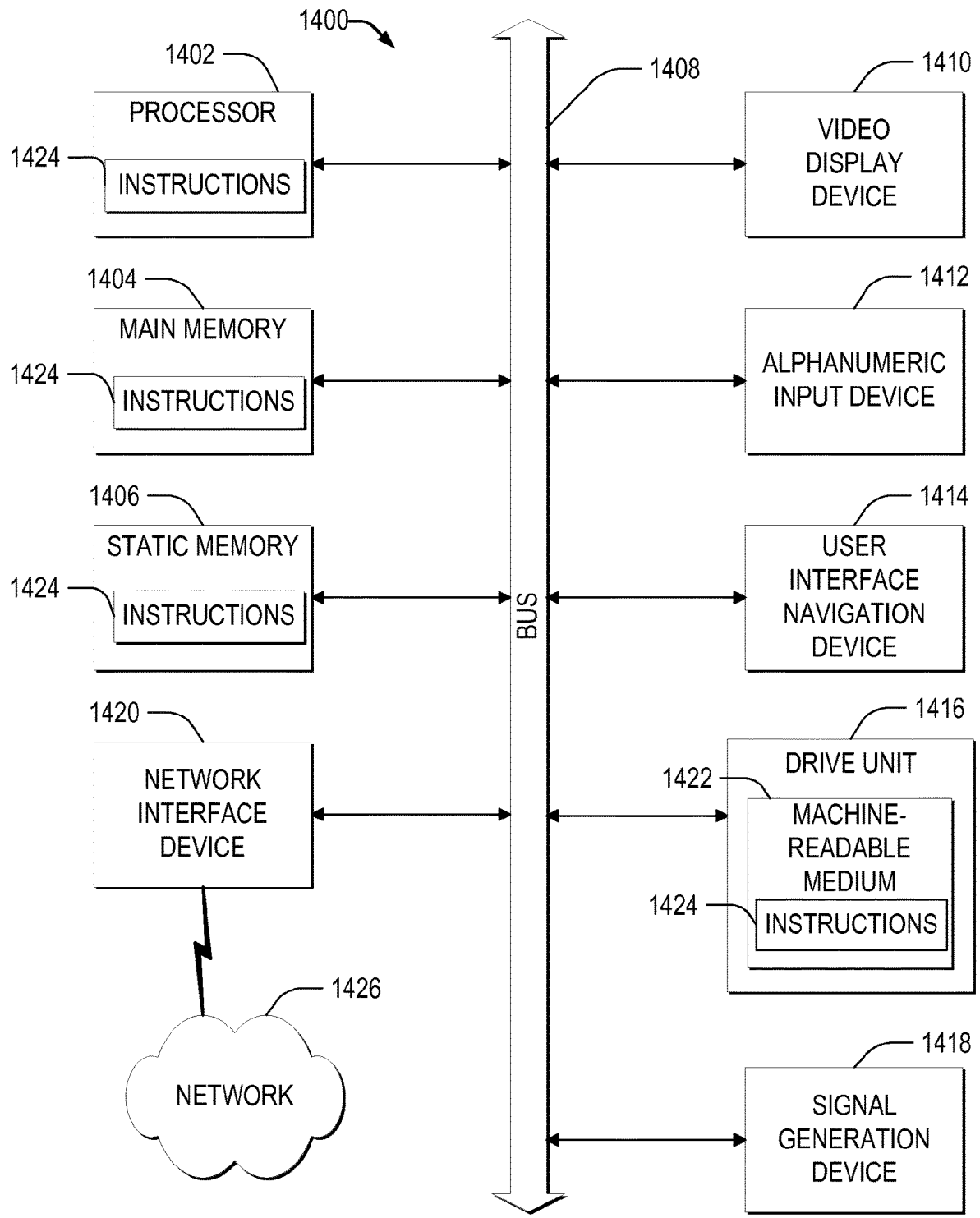
FIG. 14 is a block diagram of a machine in the example form of a computer system within which a set of instructions, for causing the machine to perform any one or more of the methodologies discussed herein, may be executed, according to some embodiments.

FIG. 14 is a block diagram of a machine in the example form of a computer system 1400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1400 includes a processor 1402 (e.g., a central processing unit (CPU), a graphics processing unit (GPU), or both), a main memory 1404, and a static memory 1406, which communicate with each other via a bus 1408. Computer system 1400 may further include a video display device 1410 (e.g., a liquid crystal display (LCD) or a cathode ray tube (CRT)). Computer system 1400 also includes an alphanumeric input device 1412 (e.g., a keyboard), a user interface navigation device 1414 (e.g., a mouse or touch sensitive display), a disk drive unit 1416, a signal generation device 1418 (e.g., a speaker), and a network interface device 1420.

Disk drive unit 1416 includes a machine-readable medium 1422 on which is stored one or more sets of instructions and data structures (e.g., software) 1424 embodying or utilized by any one or more of the methodologies or functions described herein. Instructions 1424 may also reside, completely or at least partially, within main memory 1404, within static memory 1406, and/or within processor 1402 during execution thereof by computer system 1400, with main memory 1404 and processor 1402 also constituting machine-readable media.

While machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 1424 may further be transmitted or received over a communications network 1426 using a transmission medium. Instructions 1424 may be transmitted using network interface device 1420 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
exchanging, by an accounting platform server, with a website of a bank, a public key of the accounting platform server and a public key of the bank, the accounting platform server configured to maintain bookkeeping accounts for a plurality of entities including a user of a client device;
presenting, by the accounting platform server, an invoice including an amount and a payment button to the client device of the user, the payment button being associated with an option to pay the amount to an entity through the bank;
detecting, by the accounting platform server, via the presented payment button, a request to pay the amount through a user account of the bank:
responsive to the detected request to pay:
encrypting, by the accounting platform server and using the public key of the bank, data for processing the invoice;
sending, by the accounting platform server, the encrypted data to the client device; and
redirecting, by the accounting platform server, the client device to the website of the bank;
responsive to the redirection of the web browser by the accounting platform server, at a server of the bank:
receiving, from the accounting platform server via the client device and the network, the encrypted data;
decrypting, using a decryption key, the encrypted data;
automatically causing a second user interface to be presented on the web browser running on the client device, the second user interface comprising an option to transfer a quantity of funds from the account of the user to the account of the entity, the quantity of funds being set by the server of the bank to the amount to be paid based on the decrypted data; and in response to selection of the option to transfer the quantity of funds, transferring the quantity of funds from the account of the user to the account of the entity.

2. The method of claim 1, comprising:
receiving, by the accounting platform server, from the website of the bank, an indication that the amount of the invoice was transferred from the user account to the account of the entity.

3. The method of claim 2, wherein the indication indicates that the amount was transferred via Automated Clearing House (ACH).

4. The method of claim 1, wherein the encrypted data includes at least one of the following: data identifying the bank of the user, an identity of the user, the amount, a description associated with the invoice, and data identifying the account of the entity.

5. The method of claim 1, wherein the transfer of the quantity of funds from the account of the user to the account of the entity does not transfer the amount through an intermediate account.

6. The method of claim 1, wherein the encrypted data is signed using a private key.

7. The method of claim 1, comprising:
generating a set of banks based on availability of a public key for each bank of the set of banks in a database;
presenting a user interface operable to select the bank from the set of banks; and
detecting a selection of the bank in the user interface.

8. A system comprising:
a memory; and
one or more modules coupled to the memory and configured to:
exchange, by an accounting platform server, with a website of a bank, a public key of the accounting platform server and a public key of the bank, the accounting platform server configured to maintain bookkeeping accounts for a plurality of entities including a user of a client device;
present, by the accounting platform server, an invoice including an amount and a payment button to the client device of the user, the payment button being associated with an option to pay the amount to an entity through the bank;
detect, by the accounting platform server, via the presented payment button, a request to pay the amount through a user account of the bank:
responsive to the detected request to pay:
encrypt, by the accounting platform server and using the public key of the bank, data for processing the invoice;
send, by the accounting platform server, the encrypted data to the client device; and
redirect, by the accounting platform server, the client device to the website of the bank;
responsive to the redirection of the web browser by the accounting platform server, at a server of the bank:
receive, from the accounting platform server via the client device and the network, the encrypted data;
decrypt, using a decryption key, the encrypted data;
automatically cause a second user interface to be presented on the web browser running on the client device, the second user interface comprising an option to transfer a quantity of funds from the account of the user to the account of the entity, the quantity of funds being set by the server of the bank to the amount to be paid based on the decrypted data; and
in response to selection of the option to transfer the quantity of funds, transfer the quantity of funds from the account of the user to the account of the entity.

9. The system of claim 8, wherein the one or more modules are further configured to:
receive, by the accounting platform server, from the website of the bank, an indication that the amount of the invoice was transferred from the user account to the account of the entity.

10. The system of claim 9, wherein the indication indicates that the amount was transferred via Automated Clearing House (ACH).

11. The system of claim 8, wherein the encrypted data includes at least one of the following: data identifying the bank of the user, an identity of the user, the amount, a description associated with the invoice, and data identifying the account of the entity.

12. The system of claim 8, wherein the transfer of the quantity of funds from the account of the user to the account of the entity does not transfer the quantity of funds through an intermediate account.

13. The system of claim 8, wherein the encrypted data is signed using a private key.

14. The system of claim 8, wherein the one or more modules are further configured to:
generate a set of banks based on availability of a public key for each bank of the set of banks in a database;
present a user interface operable to select the bank from the set of banks; and
detect a selection of the bank in the user interface.

15. A non-transitory machine-readable storage medium storing instructions which, when executed by one or more processors, cause the one or more processors to perform operations comprising:
exchanging, by an accounting platform server, with a website of a bank, a public key of the accounting platform server and a public key of the bank, the accounting platform server configured to maintain bookkeeping accounts for a plurality of entities including a user of a client device;
presenting, by the accounting platform server, an invoice including an amount and a payment button to the client device of the user, the payment button being associated with an option to pay the amount to an entity through the bank;
detecting, by the accounting platform server, via the presented payment button, a request to pay the amount through a user account of the bank:
responsive to the detected request to pay:
encrypting, by the accounting platform server and using the public key of the bank, data for processing the invoice;
sending, by the accounting platform server, the encrypted data to the client device; and
redirecting, by the accounting platform server, the client device to the website of the bank;
responsive to the redirection of the web browser by the accounting platform server, at a server of the bank:
receiving, from the accounting platform server via the client device and the network, the encrypted data;
decrypting, using a decryption key, the encrypted data;

automatically causing a second user interface to be presented on the web browser running on the client device, the second user interface comprising an option to transfer a quantity of funds from the account of the user to the account of the entity, the quantity of funds being set by the server of the bank to the amount to be paid based on the decrypted data; and in response to selection of the option to transfer the quantity of funds, transferring the quantity of funds from the account of the user to the account of the entity.

16. The non-transitory machine-readable storage medium of claim 15, wherein the operations further comprise:

receiving, by the accounting platform server, from the website of the bank, an indication that the amount of the invoice was transferred from the user account to the account of the entity.

17. The non-transitory machine-readable storage medium of claim 16, wherein the indication indicates that the amount was transferred via Automated Clearing House (ACH).

18. The non-transitory machine-readable storage medium of claim 15, wherein the encrypted data includes at least one of the following: data identifying the bank of the user, an identity of the user, the amount, a description associated with the invoice, and data identifying the account of the entity.

19. The non-transitory machine-readable storage medium of claim 15, wherein the transfer of the quantity of funds from the account of the user to the account of the entity does not transfer the amount through an intermediate account.

20. The non-transitory machine-readable storage medium of claim 15, wherein the operations further comprise: generating a set of banks based on availability of a public key for each bank of the set of banks in a database; presenting a user interface operable to select the bank from the set of banks; and detecting a selection of the bank in the user interface.

* * * * *